US012781161B2

(12) United States Patent
Bay et al.

(10) Patent No.: US 12,781,161 B2
(45) Date of Patent: Nov. 3, 2026

(54) ORGANIC COMPOUNDS

(71) Applicant: GIVAUDAN SA, Vernier (CH)

(72) Inventors: Olivia Bay, Singapore (SG); Guy Emmanuel De Boudemange, Singapore (SG); Antoine Charbonnier, Ermont (FR); Jeremy Compton, Kloten (CH); Eleonore David, Paris (FR)

(73) Assignee: GIVAUDAN SA, Vernier (CH)

( * ) Notice: Subject to any disclaimer, the term of this patent is extended or adjusted under 35 U.S.C. 154(b) by 627 days.

(21) Appl. No.: 18/250,443

(22) PCT Filed: Nov. 23, 2021

(86) PCT No.: PCT/EP2021/082584

§ 371 (c)(1),
(2) Date: Apr. 25, 2023

(87) PCT Pub. No.: WO2022/112202

PCT Pub. Date: Jun. 2, 2022

(65) Prior Publication Data

US 2023/0399590 A1 Dec. 14, 2023

(30) Foreign Application Priority Data

Nov. 24, 2020 (GB) ...................................... 2018435

(51) Int. Cl.

| | |
|---|---|
| ***C11D 3/50*** | (2006.01) |
| ***B01J 3/08*** | (2006.01) |
| ***B01J 13/08*** | (2006.01) |
| ***C11D 3/12*** | (2006.01) |
| ***C11D 3/22*** | (2006.01) |
| ***C11D 3/37*** | (2006.01) |
| ***C11D 3/384*** | (2006.01) |
| ***C11D 11/00*** | (2006.01) |
| ***C11D 17/00*** | (2006.01) |

(52) U.S. Cl.

CPC ............... *C11D 3/505* (2013.01); *B01J 13/08* (2013.01); *C11D 3/124* (2013.01); *C11D 3/222* (2013.01); *C11D 3/3703* (2013.01); *C11D 3/3761* (2013.01); *C11D 3/384* (2013.01); *C11D 11/0088* (2013.01); *C11D 17/0039* (2013.01)

(58) Field of Classification Search

CPC ....... C11D 3/3703; C11D 3/222; C11D 3/384; C11D 3/505; C11D 3/124; C11D 3/3761; C11D 11/0088; C11D 11/02; C11D 17/0039; B01J 13/08

USPC ........................................................... 512/4, 1

See application file for complete search history.

(56) References Cited

U.S. PATENT DOCUMENTS

| | | | | |
|---|---|---|---|---|
| 9,222,055 | B2 | 12/2015 | Fraser et al. | |
| 2007/0149424 | A1 | 6/2007 | Warr et al. | |
| 2009/0275494 | A1 | 11/2009 | Ferguson et al. | |
| 2019/0241832 | A1* | 8/2019 | Provan | C11B 9/0034 |
| 2019/0358603 | A1 | 11/2019 | Jurisch et al. | |
| 2020/0087598 | A1 | 3/2020 | Struillou et al. | |
| 2022/0177815 | A1* | 6/2022 | Popplewell | A01N 65/00 |

FOREIGN PATENT DOCUMENTS

| | | | |
|---|---|---|---|
| WO | 1999055819 | A1 | 11/1999 |
| WO | 2013036662 | A1 | 3/2013 |
| WO | 2020049192 | A2 | 3/2020 |
| WO | 2020064467 | A1 | 4/2020 |

OTHER PUBLICATIONS

International Search Report and Written Opinion of the International Searching Authority for corresponding application PCT/EP2021/082584 dated Jan. 17, 2022.

GB Search Report for corresponding application GB 2018435.4 dated Aug. 10, 2021.

Sahlan M., et al., "IOP Conference Series: Materials Science and Engineering", vol. 214, Jul. 1, 2017, p. 012005, XP093127238.

* cited by examiner

*Primary Examiner* — Jessica Whiteley

(74) *Attorney, Agent, or Firm* — Norris McLaughlin, PA

(57) ABSTRACT

Disclosed is an encapsulated composition comprising a perfume composition that is entrapped in a water-soluble matrix. The perfume composition comprises at least one biodegradable ingredient. The at least one biodegradable ingredient is present at a total concentration of at least 75 wt.-%, relative to the total weight of the perfume composition.

30 Claims, No Drawings

ORGANIC COMPOUNDS

This is an application filed under 35 USC 371 based on PCT/EP2021/082584 filed 23 Nov. 2021, which claimed priority to GB 2018435.4, filed 24 Nov. 2020. The present application claims the full priority benefit of all prior applications and incorporates by reference their full disclosures as if set forth herein.

The present invention relates to an encapsulated composition comprising a perfume composition that is entrapped in a water-soluble matrix, to a process for making such a composition and to a use of such a composition for obtaining a consumer product.

It is known to incorporate encapsulated functional materials in consumer products, such as household care, personal care and fabric care products. Functional materials include for example perfumes, cosmetic actives, and biologically active ingredients, such as biocides and drugs.

Spray-drying is a well-known technique for the encapsulation of perfumes. Such spray-dried perfume compositions are commonly prepared from an emulsion of the perfume to be encapsulated, which is sprayed into a drying chamber. In this process, biopolymers with surface active properties are generally used as emulsifiers which, upon spray-drying, form a water-soluble matrix in which the perfume becomes entrapped.

By way of example, WO 1999/055819 A1 relates to modified starch encapsulated high impact perfume accords.

Such spray-dried compositions provide a powder perfume format which is simple to manufacture and shows good odor benefits. Furthermore, since nowadays consumers are more aware of environmental and resource protection, those encapsulates have become even more attractive, as they are often based on bio-sourced materials. The spray-dried compositions thus have a low ecological footprint and allow for encapsulation of perfumes with high efficiency. They also exhibit beneficial release properties.

However, despite those advantages, there is still a need to provide perfume compositions of the above-mentioned kind showing improved overall sustainability.

This problem is solved by the subject-matter of the independent claims.

The present invention relates to an encapsulated composition comprising a perfume composition that is entrapped in a water-soluble matrix. The perfume composition comprises, preferably consists of, at least one, preferably at least two, more preferably at least four, even more preferably at least eight, even still more preferably at least sixteen, biodegradable ingredient(s). The biodegradable ingredient(s) is/are present at a total concentration of at least 75 wt.-%, preferably at least 80 wt.-%, more preferably at least 85 wt.-%, even more preferably at least 90 wt.-%, even still more preferably at least 95 wt.-%, relative to the total weight of the perfume composition.

In context of the present invention, a "biodegradable ingredient" is an ingredient which meets the pass criteria for "inherently biodegradable" and/or "readily biodegradable" in at least one OECD biodegradation study. In order to avoid any ambiguity, this means that if an ingredient passes one test but fails one or more other ones, the pass result overrules the other test results.

"Ultimate biodegradability" refers to the complete breakdown of a chemical into water, carbon dioxide and new biomass.

For assessment of the pass criteria for "readily biodegradable", the biodegradation study can be selected from the group consisting of OECD Method 301C, OECD Method 301D, OECD Method 301F and OECD Method 310. These methods are suitable for volatile materials.

OECD Method 301C, OECD Method 301D and OECD Method 301F are described in the OECD Guidelines for the Testing of Chemicals, Section 3, Test No. 301: Ready Biodegradability (Adopted: 17 Jul. 1992; https://doi.org/10.1787/9789264070349-en).

OECD Method 310 is described in the OECD Guidelines for the Testing of Chemicals, Section 3, Test No. 310: Ready Biodegradability—$CO_2$ in sealed vessels (Headspace Test) (Adopted: 23 Mar. 2006; Corrected: 26 Sep. 2014; https://doi.org/10.1787/9789264016316-en).

In a particular aspect of the present invention, the pass criteria for "readily biodegradable" are assessed according to OECD Method 301F, which refers to manometric respirometry. In this method the pass level for "ready biodegradability" is to reach 60% of theoretical oxygen demand and/or chemical oxygen demand. This pass value has to be reached in a 10-day window within the 28-day period of the test. The 10-day window begins when the degree of biodegradation has reached 10% of theoretical oxygen demand and/or chemical oxygen demand and must end before day 28 of the test. A preferred way of conducting OECD Method 301F is provided herein below.

Given a positive result in a test of ready biodegradability, it may be assumed that the chemical will undergo rapid and ultimate biodegradation in the environment (Introduction to the OECD Guidelines for the Testing of Chemicals, Section 3, Part 1: Principles and Strategies Related to the Testing of Degradation of Organic Chemicals; Adopted: July 2003).

For assessment of the pass criteria for "inherently biodegradable", the biodegradation study can be OECD Method 302C, but also OECD Method 301F can be used, although with different pass criteria. Also these methods are suitable for volatile materials.

OECD Method 302C is described in the OECD Guidelines for the Testing of Chemicals, Section 3, Test No. 302C: Inherent Biodegradability: Modified MITI Test (II) (Adopted: 12 May 1981; Corrected 8 Sep. 2009; https://doi.org/10.1787/9789264070400-en).

In a particular aspect of the present invention, the pass criteria for "inherently biodegradable" are assessed by OECD Method 302C. In this method the pass level for "inherently biodegradability" is then to reach 70% of theoretical oxygen demand. There is no time limit to reach this level.

Biodegradation rates above 70% may be regarded as evidence of inherent, ultimate biodegradability (OECD Guidelines for the Testing of Chemicals, Section 3, Part 1: Principles and Strategies Related to the Testing of Degradation of Organic Chemicals; Adopted: July 2003).

If OECD Method 301F is used for assessment of the pass criteria for "inherently biodegradable", the pass level is 60% of theoretical oxygen demand and/or chemical oxygen demand. This pass value can be reached after the 28-day period of the test, which is usually extended to 60 days. No 10-day window applies.

In the present context, if an ingredient is an essential oil, it is considered to be a "biodegradable ingredient" if all of its constituents present at a level ≥1 wt.-% fall under the definition of "inherently biodegradable" and/or "readily biodegradable" as defined herein above. However, the essential oil can also be subjected to the above-mentioned biodegradation tests.

Encapsulated compositions of the present kind typically have a proportion of perfume composition of up to 50 wt.-%, relative to the total weight of the composition, meaning that a significant portion of the mass of the encapsulated composition consists the perfume composition. As a consequence of this, the overall ecological footprint of the capsule can be significantly improved—independent of the matrix material—by using biodegradable ingredient(s) for the perfume composition. Biodegradation is the key process for removal of perfume ingredients in the environment.

In a particular embodiment of the present invention, the biodegradable ingredient(s) is/are selected from the group consisting of ACETOPHENONE EXTRA (1-phenylethanone); ADOXAL (2,6,10-trimethylundec-9-enal); AGRUMEX (2-(tert-butyl)cyclohexyl acetate); ALCOHOL C 6 HEXYLIC (hexan-1-ol); ALDEHYDE C 10 DECYLIC (decanal); ALDEHYDE C 11 MOA (2-methyldecanal); ALDEHYDE C 11 UNDECYLENIC (undec-10-enal); ALDEHYDE C 110 UNDECYLIC (undecanal); ALDEHYDE C 12 LAURIC (dodecanal); ALDEHYDE C 12 MNA PURE (2-methylundecanal); ALDEHYDE C 6 HEXYLIC FOOD GRADE (hexan-1-al); ALDEHYDE C 8 OCTYLIC FOOD GRADE (octanal); ALDEHYDE C 9 ISONONYLIC (3,5,5-trimethylhexanal); ALDEHYDE C 9 NONYLIC FOOD GRADE (nonanal); ALDEHYDE ISO C 11 ((E)-undec-9-enal); ALLYL AMYL GLYCOLATE (prop-2-enyl 2-(3-methylbutoxy)acetate); ALLYL CAPROATE (prop-2-enyl hexanoate); ALLYL CYCLOHEXYL PROPIONATE (prop-2-enyl 3-cyclohexylpropanoate); ALLYL OENANTHATE (prop-2-enyl heptanoate); AMBERKETAL (3,8,8,11a-tetramethyldodecahydro-1H-3,5a-epoxynaphtho[2,1-c]oxepine); AMBRETTOLIDE ((Z)-oxacycloheptadec-10-en-2-one); AMBROFIX ((3aR,5aS,9aS,9bR)-3a,6,6,9a-tetramethyl-2,4,5,5a,7,8,9,9b-octahydro-1H-benzo[e][1]benzofuran); AMYL BUTYRATE (pentyl butanoate); AMYL CINNAMIC ALDEHYDE ((Z)-2-benzylideneheptanal); AMYL SALICYLATE (pentyl 2-hydroxybenzoate); ANETHOLE ((E)-1-methoxy-4-(prop-1-en-1-yl)benzene); ANISYL ACETATE (4-methoxybenzyl acetate); APHERMATE (1-(3,3-dimethylcyclohexyl)ethyl formate); AUBEPINE PARA CRESOL (4-methoxybenzaldehyde); AURANTIOL ((E)-methyl 2-((7-hydroxy-3,7-dimethyloctylidene)amino)benzoate); BENZALDEHYDE (benzaldehyde); BENZYL ACETATE (benzyl acetate); BENZYL ACETONE (4-phenylbutan-2-one); BENZYL ALCOHOL (phenylmethanol); BENZYL BENZOATE (benzyl benzoate); BENZYL CINNAMATE (benzyl 3-phenylprop-2-enoate); BENZYL SALICYLATE (benzyl 2-hydroxybenzoate); BICYCLO NONALACTONE (octahydro-2H-chromen-2-one); BORNEOL CRYSTALS ((1S,2S,4S)-1,7,7-trimethylbicyclo[2.2.1]heptan-2-ol); BORNYL ACETATE ((2S,4S)-1,7,7-trimethylbicyclo[2.2.1]heptan-2-yl acetate); BOURGEONAL (3-(4-(tert-butyl)phenyl)propanal); BUTYL ACETATE (butyl acetate); BUTYL CYCLOHEXYL ACETATE PARA (4-(tert-butyl)cyclohexyl acetate); CAMPHOR ((1S,4S)-1,7,7-trimethylbicyclo[2.2.1]heptan-2-one); CARVONE LAEVO ((5R)-2-methyl-5-prop-1-en-2-ylcyclohex-2-en-1-one); CEDRYL METHYL ETHER ((1R,6S,8aS)-6-methoxy-1,4,4,6-tetramethyloctahydro-1H-5,8a-methanoazulene); CETONE V ((E)-1-(2,6,6-trimethylcyclohex-2-en-1-yl)hepta-1,6-dien-3-one); CINNAMIC ALCOHOL SYNTHETIC ((E)-3-phenylprop-2-en-1-ol); CINNAMIC ALDEHYDE ((2E)-3-phenylprop-2-enal); CINNAMYL ACETATE ((E)-3-phenylprop-2-en-1-yl acetate); CIS-3-HEXENOL ((Z)-hex-3-en-1-ol); CIS JASMONE ((Z)-3-methyl-2-(pent-2-en-1-yl)cyclopent-2-enone); CITRAL ((E)-3,7-dimethylocta-2,6-dienal); CITRONELLAL (3,7-dimethyloct-6-enal); CITRONELLOL (3,7-dimethyloct-6-en-1-ol); CITRONELLYL ACETATE (3,7-dimethyloct-6-en-1-yl acetate); CITRONELLYL FORMATE (3,7-dimethyloct-6-en-1-yl formate); CITRONELLYL NITRILE (3,7-dimethyloct-6-enenitrile); CLONAL (dodecanenitrile); CORANOL (4-cyclohexyl-2-methylbutan-2-ol); CORYLONE DRIED (2-hydroxy-3-methylcyclopent-2-enone); COSMONE ((Z)-3-methylcyclotetradec-5-enone); COUMARIN PURE CRYSTALS (2H-chromen-2-one); CRESYL METHYL ETHER PARA (1-methoxy-4-methylbenzene); CUMIN NITRILE (4-isopropylbenzonitrile); CYCLAMEN ALDEHYDE EXTRA (3-(4-isopropylphenyl)-2-methylpropanal); DAMASCENONE ((E)-1-(2,6,6-trimethylcyclohexa-1,3-dien-1-yl)but-2-en-1-one); DAMASCONE ALPHA ((E)-1-(2,6,6-trimethylcyclohex-2-en-1-yl)but-2-en-1-one); DECALACTONE GAMMA (5-hexyloxolan-2-one); DECENAL-4-TRANS ((E)-dec-4-enal); DIHYDRO ANETHOLE (1-methoxy-4-propylbenzene); DIHYDRO MYRCENOL (2,6-dimethyloct-7-en-2-ol); DIMETHYL BENZYL CARBINYL ACETATE (2-methyl-1-phenylpropan-2-yl acetate); DIMETHYL BENZYL CARBINYL BUTYRATE (2-methyl-1-phenylpropan-2-yl butanoate); DIMETOL (2,6-dimethylheptan-2-ol); DIPHENYL OXIDE (oxydibenzene); DODECENAL ((E)-dodec-2-enal); EBANOL ((E)-3-methyl-5-(2,2,3-trimethylcyclopent-3-en-1-yl)pent-4-en-2-ol); ESTERLY (ethyl cyclohexyl carboxylate); ETHYL ACETATE (ethyl acetate); ETHYL ACETOACETATE (ethyl 3-oxobutanoate); ETHYL CINNAMATE (ethyl 3-phenylprop-2-enoate); ETHYL HEXANOATE (ethyl hexanoate); ETHYL LINALOOL ((E)-3,7-dimethylnona-1,6-dien-3-ol); ETHYL MALTOL (2-ethyl-3-hydroxy-4H-pyran-4-one); ETHYL METHYL-2-BUTYRATE (ethyl 2-methylbutanoate); ETHYL OENANTHATE (ethyl heptanoate); ETHYL VANILLIN (3-ethoxy-4-hydroxybenzaldehyde); ETHYLENE BRASSYLATE (1,4-dioxacycloheptadecane-5,17-dione); EUCALYPTOL NATURAL ((1s,4s)-1,3,3-trimethyl-2-oxabicyclo[2.2.2]octane); EUGENOL (4-allyl-2-methoxyphenol); EVERNYL (methyl 2,4-dihydroxy-3,6-dimethylbenzoate); FENCHYL ALCOHOL ((1S,2R,4R)-1,3,3-trimethylbicyclo[2.2.1]heptan-2-ol); FENNALDEHYDE (3-(4-methoxyphenyl)-2-methylpropanal); FLORHYDRAL (3-(3-isopropylphenyl)butanal); FLOROSA HC (tetrahydro-4-methyl-2-(2-methylpropyl)-2H-pyran-4-ol); FRESKOMENTHE (2-(sec-butyl)cyclohexanone); FRUTONILE (2-methyldecanenitrile); GALBANONE PURE (1-(5,5-dimethylcyclohex-1-en-1-yl)pent-4-en-1-one); GERANIOL ((E)-3,7-dimethylocta-2,6-dien-1-ol); GERANYL ACETATE ((E)-3,7-dimethylocta-2,6-dien-1-yl acetate); GERANYL ACETONE ((E)-6,10-dimethylundeca-5,9-dien-2-one); HABANOLIDE ((E)-oxacyclohexadec-12-en-2-one); HEDIONE (methyl 3-oxo-2-pentylcyclopentaneacetate); HELIOTROPINE CRYSTALS (benzo[d][1,3]dioxole-5-carbaldehyde); HEXENAL-2-TRANS ((E)-hex-2-enal); HEXENOL-3-CIS ((Z)-hex-3-en-1-ol); HEXENYL-3-CIS ACETATE ((Z)-hex-3-en-1-yl acetate); HEXENYL-3-CIS ISOBUTYRATE ((Z)-hex-3-en-1-yl 2-methylpropanoate); HEXENYL-3-CIS SALICYLATE ((Z)-hex-3-en-1-yl 2-hydroxybenzoate); HEXYL ACETATE (hexyl acetate); HEXYL CINNAMIC ALDEHYDE ((E)-2-benzylideneoctanal); HEXYL ISOBUTYRATE (hexyl 2-methylpropanoate); HEXYL SALICYLATE (hexyl 2-hydroxybenzoate); HYDROXYCITRONELLAL (7-hydroxy-3,7-dimethyloctanal); INDOLE PURE (1H-indole); IONONE BETA ((E)-4-(2,6,6-trimethylcyclohex-1-en-1-yl)but-3-en-2-one); IRISONE ALPHA ((E)-4-(2,6,6-trimethylcyclohex-2-en-1-yl)but-3-en-2-one); ISOAMYL ACETATE EXTRA (3-methylbutyl acetate); ISOEUGENOL ((E)-2-methoxy-4-(prop-1-en-1-yl)phenol); ISOMENTHONE DL (2-isopropyl-5-methylcyclohexanone); ISOPROPYL METHYL-2-BUTYRATE (isopropyl 2-methylbutanoate); ISORALDEINE ((E)-3-methyl-4-(2,6,6-trimethylcyclohex-2-en-1-yl)but-3-en-2-one); JASMONE CIS ((Z)-3-methyl-2-(pent-2-en-1-yl)cyclopent-2-enone); JASMONYL (3-butyl-5-methyltetrahydro-2H-pyran-4-yl acetate); JASMOPYRANE FORTE (3-pentyltetrahydro-2H-pyran-4-yl acetate); LIFFAROME ((Z)-hex-3-en-1-yl methyl carbonate); LILIAL (3-(4-(tert-butyl)phenyl)-2-methylpropanal); LIMONENE, LIMONENE, or LAEVO, LIMONENE DEXTRO (1-methyl-4-prop-1-en-2-yl-cyclohexene); LINALOOL OXIDE (2-(5-methyl-5-vinyltetrahydrofuran-2-yl)propan-2-ol); LINALOOL (3,7-dimethylocta-1,6-dien-3-ol); LINALYL ACETATE (3,7-dimethylocta-1,6-dien-3-yl acetate); MAHONIAL ((4E)-9-hydroxy-5,9-dimethyl-4-decenal); MALTOL (3-hydroxy-2-methyl-4H-pyran-4-one); MANZANATE (ethyl 2-methylpentanoate); MAYOL ((4-isopropylcyclohexyl)methanol); MEFROSOL (3-methyl-5-phenylpentan-1-ol); MELONAL (2,6-dimethylhept-5-enal); MENTHOL, MENTHOL LAEVO, or MENTHOL RACEMIC (2-isopropyl-5-methylcyclohexanol); MENTHONE, ISOMENTHONE, MENTHONE LAEVO, or MENTHONE RACEMIC (2-isopropyl-5-methylcyclohexanone); METHYL ANTHRANILATE EXTRA (methyl 2-aminobenzoate); METHYL BENZOATE (methyl benzoate); METHYL CINNAMATE (methyl 3-phenylprop-2-enoate); METHYL DIANTILIS (2-ethoxy-4-(methoxymethyl)phenol); METHYL DIHYDRO ISOJASMONATE (methyl 2-hexyl-3-oxocyclopentane-1-carboxylate); METHYL HEPTENONE (6-methylhept-5-en-2-one); METHYL LAITONE (8-methyl-1-oxaspiro[4.5]decan-2-one); METHYL OCTYNE CARBONATE (methyl non-2-ynoate); METHYL SALICYLATE (methyl 2-hydroxybenzoate); MUSCENONE ((Z)-3-methylcyclopentadec-5-enone); MYRALDENE (4-(4-methylpent-3-en-1-yl)cyclohex-3-enecarbaldehyde); MYRCENE (7-methyl-3-methyleneocta-1,6-diene); MYSTIKAL (2-methylundecanoic acid); NECTARYL (2-(2-(4-methylcyclohex-3-en-1-yl)propyl)cyclopentanone); NEOFOLIONE ((E)-methyl non-2-enoate); NEROLEX ((2Z)-3,7-dimethylocta-2,6-dien-1-ol); NEROLIDOL ((E)-3,7,11-trimethyldodeca-1,6,10-trien-3-ol); NEROLINE CRYSTALS (2-ethoxynaphthalene); NERYL ACETATE HC ((Z)-3,7-dimethylocta-2,6-dien-1-yl acetate); NIRVANOLIDE ((E)-13-methyloxacyclopentadec-10-en-2-one); NONADIENAL ((2E,6Z)-nona-2,6-dienal); NONADIENOL-2,6 ((2Z,6E)-2,6-nonadien-1-ol); NONALACTONE GAMMA (5-pentyloxolan-2-one); NONENAL-6-CIS ((Z)-non-6-enal); NONENOL-6-CIS ((Z)-non-6-en-1-ol); NOPYL ACETATE (2-(6,6-dimethylbicyclo[3.1.1]hept-2-en-2-yl)ethyl acetate); NYMPHEAL (3-(4-(2-methylpropyl)-2-methylphenyl)propanal); OCTANONE-2 (octan-2-one); ORANGER CRYSTALS (1-(2-naphtalenyl)-ethanone); PANDANOL ((2-methoxyethyl)benzene); PEACH PURE (5-heptyldihydrofuran-2(3H)-one); PELARGOL (3,7-dimethyloctan-1-ol); PHARAONE (2-cyclohexylhepta-1,6-dien-3-one); PHENOXY ETHYL ISOBUTYRATE (2-(phenoxy)ethyl 2-methylpropanoate); PHENYL ACETALDEHYDE (2-phenyl-ethanal); PHENYL ETHYL ACETATE (2-phenylethyl acetate); PHENYL ETHYL ALCOHOL (2-phenylethanol); PHENYL ETHYL ISOBUTYRATE (2-phenylethyl 2-methylpropanoate); PHENYL ETHYL PHENYL ACETATE (2-phenylethyl 2-phenylacetate); PHENYL PROPYL ALCOHOL (3-phenylpropan-1-ol); PINENE BETA (6,6-dimethyl-2-methylenebicyclo[3.1.1]heptane); PINOACETALDEHYDE (3-(6,6-dimethylbicyclo[3.1.1]hept-2-en-2-yl)propanal); POMAROSE ((2E,5E)-5,6,7-trimethylocta-2,5-dien-4-one); PRECYCLEMONE B (1-methyl-4-(4-methylpent-3-en-1-yl)cyclohex-3-enecarbaldehyde); PRENYL ACETATE (3-methylbut-2-en-1-yl acetate); RASPBERRY KETONE (4-(4-hydroxyphenyl)butan-2-one); ROSE OXIDE (4-methyl-2-(2-methylprop-1-en-1-yl)tetrahydro-2H-pyran); ROSYRANE SUPER (4-methyl-2-phenyl-3,6-dihydro-2H-pyran); SANDALORE EXTRA (3-methyl-5-(2,2,3-trimethylcyclopent-3-en-1-yl)pentan-2-ol); SCENTAURUS CLEAN (ethyl (Z)-2-acetyl-4-methyltridec-2-enoate); SCENTAURUS JUICY (4-(dodecylthio)-4-methylpentan-2-one); SILVANONE SUPRA (cyclopentadecanone, hexadecanolide); STYRALLYL ACETATE (1-phenylethyl acetate); SUPER MUGUET ((E)-6-ethyl-3-methyloct-6-en-1-ol); SYLKOLIDE ((E)-2-((3,5-dimethylhex-3-en-2-yl)oxy)-2-methylpropyl cyclopropanecarboxylate); TERPINENE GAMMA (1-methyl-4-propan-2-ylcyclohexa-1,4-diene); TERPINEOL ALPHA (2-(4-methyl-1-cyclohex-3-enyl)propan-2-ol); TERPINEOL PURE (2-(4-methylcyclohex-3-en-1-yl)propan-2-ol); TERPINOLENE (1-methyl-4-(propan-2-ylidene)cyclohex-1-ene); TERPINYL ACETATE (2-(4-methyl-1-cyclohex-3-enyl)propan-2-yl acetate); TETRAHYDRO LINALOOL (3,7-dimethyloctan-3-ol); THIBETOLIDE (oxacyclohexadecan-2-one); THYMOL (2-isopropyl-5-methylphenol); TOSCANOL (1-(cyclopropylmethyl)-4-methoxybenzene); TRIDECENE-2-NITRILE ((E)-tridec-2-enenitrile); TRIFERNAL (3-phenylbutanal); TROPIONAL (3-(benzo[d][1,3]dioxol-5-yl)-2-methylpropanal); METHYL NONYL KETONE (undecan-2-one); UNDECATRIENE ((3E,5Z)-undeca-1,3,5-triene); UNDECAVERTOL ((E)-4-methyldec-3-en-5-ol); VANILLIN (4-hydroxy-3-methoxybenzaldehyde); VELVIONE ((Z)-cyclohexadec-5-enone); VIOLET NITRILE ((2E,6Z)-nona-2,6-dienenitrile); and YARA YARA (2-methoxynaphtalene).

The above-mentioned ingredients have all been identified as not only fulfilling at least one of the aforementioned biodegradability criteria, but also as being suitable for encapsulation with respect to their physical and chemical properties, such as lipophilicity, molecular size and reactivity towards shell materials. They therefore provide a useful selection of perfume ingredients for readily and reliably providing more sustainable fragrance encapsulates.

In an encapsulated composition according to the present invention, each of the biodegradable ingredient(s) is preferably present at a concentration equal to or less than the following maximum concentrations:

1-phenylethanone: 0.5 wt.-%
2,6,10-trimethylundec-9-enal: 1 wt.-%
2-(tert-butyl)cyclohexyl acetate: 50 wt.-%
hexan-1-ol: 10 wt.-%
decanal: 10 wt.-%
2-methyldecanal: 0.5 wt.-%
undec-10-enal: 2 wt.-%
undecanal: 5 wt.-%
dodecanal: 10 wt.-%
2-methylundecanal: 50 wt.-%
hexanal: 5 wt.-%
octanal: 5 wt.-%
3,5,5-trimethylhexanal: 0.5 wt.-%
nonanal: 5 wt.-%
(E)-undec-9-enal: 5 wt.-%
prop-2-enyl 2-(3-methylbutoxy)acetate: 5 wt.-%
prop-2-enyl hexanoate: 5 wt.-%
prop-2-enyl 3-cyclohexylpropanoate: 10 wt.-%
prop-2-enyl heptanoate: 10 wt.-%
3,8,8,11a-tetramethyldodecahydro-1H-3,5a-epoxynaphtho[2,1-c]oxepine: 2 wt.-%

(Z)-oxacycloheptadec-10-en-2-one: 2 wt.-%
(3aR,5aS,9aS,9bR)-3a,6,6,9a-tetramethyl-2,4,5,5a,7,8,9,9b-octahydro-1H-benzo[e][1]benzofuran: 2 wt.-%
pentyl butanoate: 2 wt.-%
(Z)-2-benzylideneheptanal: 5 wt.-%
pentyl 2-hydroxybenzoate: 50 wt.-%
(E)-1-methoxy-4-(prop-1-en-1-yl)benzene: 2 wt.-%
4-methoxybenzyl acetate: 15 wt.-%
1-(3,3-dimethylcyclohexyl)ethyl formate: 0.5 wt.-%
4-methoxybenzaldehyde: 5 wt.-%
(E)-methyl 2-((7-hydroxy-3,7-dimethyloctylidene)amino)benzoate: 0.2 wt.-%
benzaldehyde: 1 wt.-%
benzyl acetate: 10 wt.-%
4-phenylbutan-2-one: 10 wt.-%
phenylmethanol: 10 wt.-%
benzyl benzoate: 85 wt.-%
benzyl 3-phenylprop-2-enoate: 2 wt.-%
benzyl 2-hydroxybenzoate: 75 wt.-%
octahydro-2H-chromen-2-one: 2 wt.-%
(1S,2S,4S)-1,7,7-trimethylbicyclo[2.2.1]heptan-2-ol: 10 wt.-%
(2S,4S)-1,7,7-trimethylbicyclo[2.2.1]heptan-2-yl acetate: 35 wt.-%
3-(4-(tert-butyl)phenyl)propanal: 2 wt.-%
butyl acetate: 2 wt.-%
4-(tert-butyl)cyclohexyl acetate: 50 wt.-%
(1S,4S)-1,7,7-trimethylbicyclo[2.2.1]heptan-2-one: 25 wt.-%
(5R)-2-methyl-5-prop-1-en-2-ylcyclohex-2-en-1-one: 25 wt.-%
(1R,6S,8aS)-6-methoxy-1,4,4,6-tetramethyloctahydro-1H-5,8a-methanoazulene: 5 wt.-%
(E)-1-(2,6,6-trimethylcyclohex-2-en-1-yl)hepta-1,6-dien-3-one: 0.5 wt.-%
(E)-3-phenylprop-2-en-1-ol: 10 wt.-%
(2E)-3-phenylprop-2-enal: 35 wt.-%
(E)-3-phenylprop-2-en-1-yl acetate: 0.5 wt.-%
(Z)-hex-3-en-1-ol: 25 wt.-%
(Z)-3-methyl-2-(pent-2-en-1-yl)cyclopent-2-enone: 2 wt.-%
(E)-3,7-dimethylocta-2,6-dienal: 5 wt.-%
3,7-dimethyloct-6-enal: 1 wt.-%
3,7-dimethyloct-6-en-1-ol: 25 wt.-%
3,7-dimethyloct-6-en-1-yl acetate: 25 wt.-%
3,7-dimethyloct-6-en-1-yl formate: 1 wt.-%
3,7-dimethyloct-6-enenitrile: 10 wt.-%
dodecanenitrile: 10 wt.-%
4-cyclohexyl-2-methylbutan-2-ol: 5 wt.-%
2-hydroxy-3-methylcyclopent-2-enone: 5 wt.-%
(Z)-3-methylcyclotetradec-5-enone: 5 wt.-%
2H-chromen-2-one: 5 wt.-%
1-methoxy-4-methylbenzene: 1 wt.-%
4-isopropylbenzonitrile: 0.5 wt.-%
3-(4-isopropylphenyl)-2-methylpropanal: 5 wt.-%
(E)-1-(2,6,6-trimethylcyclohexa-1,3-dien-1-yl)but-2-en-1-one: 2.5 wt.-%
(E)-1-(2,6,6-trimethylcyclohex-2-en-1-yl)but-2-en-1-one: 5 wt.-%
5-hexyloxolan-2-one: 15 wt.-%
(E)-dec-4-enal: 1 wt.-%
1-methoxy-4-propylbenzene: 2 wt.-%
2,6-dimethyloct-7-en-2-ol: 50 wt.-%
2-methyl-1-phenylpropan-2-yl acetate: 75 wt.-%
2-methyl-1-phenylpropan-2-yl butanoate: 50 wt.-%
2,6-dimethylheptan-2-ol: 5 wt.-%
oxydibenzene: 15 wt.-%
(E)-dodec-2-enal: 0.1 wt.-%
(E)-3-methyl-5-(2,2,3-trimethylcyclopent-3-en-1-yl)pent-4-en-2-ol: 5 wt.-%
ethyl cyclohexyl carboxylate: 0.5 wt.-%
ethyl acetate: 10 wt.-%
ethyl 3-oxobutanoate: 2 wt.-%
ethyl 3-phenylprop-2-enoate: 2 wt.-%
ethyl hexanoate: 10 wt.-%
(E)-3,7-dimethylnona-1,6-dien-3-ol: 35 wt.-%
2-ethyl-3-hydroxy-4H-pyran-4-one: 10 wt.-%
ethyl 2-methylbutanoate: 15 wt.-%
ethyl heptanoate: 5 wt.-%
3-ethoxy-4-hydroxybenzaldehyde: 10 wt.-%
1,4-dioxacycloheptadecane-5,17-dione: 25 wt.-%
(1s,4s)-1,3,3-trimethyl-2-oxabicyclo[2.2.2]octane: 25 wt.-%
4-allyl-2-methoxyphenol: 5 wt.-%
methyl 2,4-dihydroxy-3,6-dimethylbenzoate: 2 wt.-%
(1S,2R,4R)-1,3,3-trimethylbicyclo[2.2.1]heptan-2-ol: 2 wt.-%
3-(4-methoxyphenyl)-2-methylpropanal: 2 wt.-%
3-(3-isopropylphenyl)butanal: 5 wt.-%
tetrahydro-4-methyl-2-(2-methylpropyl)-2H-pyran-4-ol: 10 wt.-%
2-(sec-butyl)cyclohexanone: 10 wt.-%
2-methyldecanenitrile: 1 wt.-%
1-(5,5-dimethylcyclohex-1-en-1-yl)pent-4-en-1-one: 5 wt.-%
(E)-3,7-dimethylocta-2,6-dien-1-ol: 25 wt.-%
(E)-3,7-dimethylocta-2,6-dien-1-yl acetate: 10 wt.-%
(E)-6,10-dimethylundeca-5,9-dien-2-one: 1 wt.-%
(E)-oxacyclohexadec-12-en-2-one: 15 wt.-%
methyl 3-oxo-2-pentylcyclopentaneacetate: 75 wt.-%
benzo[d][1,3]dioxole-5-carbaldehyde: 10 wt.-%
(E)-hex-2-enal: 1 wt.-%
(Z)-hex-3-en-1-ol: 15 wt.-%
(Z)-hex-3-en-1-yl acetate: 15 wt.-%
(Z)-hex-3-en-1-yl 2-methylpropanoate: 1 wt.-%
(Z)-hex-3-en-1-yl 2-hydroxybenzoate: 15 wt.-%
hexyl acetate: 15 wt.-%
(E)-2-benzylideneoctanal: 25 wt.-%
hexyl 2-methylpropanoate: 5 wt.-%
hexyl 2-hydroxybenzoate: 85 wt.-%
7-hydroxy-3,7-dimethyloctanal: 1 wt.-%
1H-indole: 0.5 wt.-%
(E)-4-(2,6,6-trimethylcyclohex-1-en-1-yl)but-3-en-2-one: 25 wt.-%
(E)-4-(2,6,6-trimethylcyclohex-2-en-1-yl)but-3-en-2-one: 25 wt.-%
3-methylbutyl acetate: 5 wt.-%
(E)-2-methoxy-4-(prop-1-en-1-yl)phenol: 1 wt.-%
2-isopropyl-5-methylcyclohexanone: 1 wt.-%
isopropyl 2-methylbutanoate: 5 wt.-%
(E)-3-methyl-4-(2,6,6-trimethylcyclohex-2-en-1-yl)but-3-en-2-one: 50 wt.-%
(Z)-3-methyl-2-(pent-2-en-1-yl)cyclopent-2-enone: 0.5 wt.-%
3-butyl-5-methyltetrahydro-2H-pyran-4-yl acetate: 15 wt.-%
3-pentyltetrahydro-2H-pyran-4-yl acetate: 50 wt.-%
(Z)-hex-3-en-1-yl methyl carbonate: 5 wt.-%
3-(4-(tert-butyl)phenyl)-2-methylpropanal: 25 wt.-%
1-methyl-4-prop-1-en-2-yl-cyclohexene: 85 wt.-%
2-(5-methyl-5-vinyltetrahydrofuran-2-yl)propan-2-ol: 1 wt.-%
3,7-dimethylocta-1,6-dien-3-ol: 25 wt.-%
3,7-dimethylocta-1,6-dien-3-yl acetate: 25 wt.-%
(4E)-9-hydroxy-5,9-dimethyl-4-decenal: 10 wt.-%
3-hydroxy-2-methyl-4H-pyran-4-one: 1 wt.-% ethyl 2-methylpentanoate: 10 wt.-%
(4-isopropylcyclohexyl)methanol: 5 wt.-%
3-methyl-5-phenylpentan-1-ol: 10 wt.-%
2,6-dimethylhept-5-enal: 2 wt.-%
2-isopropyl-5-methylcyclohexanol: 85 wt.-%
2-isopropyl-5-methylcyclohexanone: 2 wt.-%
methyl 2-aminobenzoate: 15 wt.-%
methyl benzoate: 1 wt.-%
methyl 3-phenylprop-2-enoate: 10 wt.-%
2-ethoxy-4-(methoxymethyl)phenol: 1 wt.-%
methyl 2-hexyl-3-oxocyclopentane-1-carboxylate: 5 wt.-%
6-methylhept-5-en-2-one: 5 wt.-%
8-methyl-1-oxaspiro[4.5]decan-2-one: 2 wt.-%
methyl non-2-ynoate: 1 wt.-%
methyl 2-hydroxybenzoate: 1 wt.-%
(Z)-3-methylcyclopentadec-5-enone: 0.5 wt.-%
4-(4-methylpent-3-en-1-yl)cyclohex-3-enecarbaldehyde: 2 wt.-%
7-methyl-3-methyleneocta-1,6-diene: 0.5 wt.-%
2-methylundecanoic acid: 0.5 wt.-%
2-(2-(4-methylcyclohex-3-en-1-yl)propyl)cyclopentanone: 50 wt.-%
(E)-methyl non-2-enoate: 2 wt.-%
(2Z)-3,7-dimethylocta-2,6-dien-1-ol: 10 wt.-%
(E)-3,7,11-trimethyldodeca-1,6,10-trien-3-ol: 5 wt.-%
2-ethoxynaphthalene: 10 wt.-%
(Z)-3,7-dimethylocta-2,6-dien-1-yl acetate: 0.5 wt.-%
(E)-13-methyloxacyclopentadec-10-en-2-one: 2 wt.-%
(2E,6Z)-nona-2,6-dienal: 0.5 wt.-%
(2Z,6E)-2,6-nonadien-1-ol: 0.1 wt.-%
5-pentyloxolan-2-one: 15 wt.-%
(Z)-non-6-enal: 0.5 wt.-%
(Z)-non-6-en-1-ol: 0.5 wt.-%
2-(6,6-dimethylbicyclo[3.1.1]hept-2-en-2-yl)ethyl acetate: 5 wt.-%
3-(4-(2-methylpropyl)-2-methylphenyl)propanal: 25 wt.-%
octan-2-one: 5 wt.-%
1-(2-naphtalenyl)-ethanone: 10 wt.-%
(2-methoxyethyl)benzene: 2 wt.-%
5-heptyldihydrofuran-2(3H)-one: 25 wt.-%
3,7-dimethyloctan-1-ol: 10 wt.-%
2-cyclohexylhepta-1,6-dien-3-one: 2 wt.-%
2-(phenoxy)ethyl 2-methylpropanoate: 10 wt.-%
2-phenyl-ethanal: 0.5 wt.-%
2-phenylethyl acetate: 15 wt.-%
2-phenylethanol: 25 wt.-%
2-phenylethyl 2-methylpropanoate: 2 wt.-%
2-phenylethyl 2-phenylacetate: 5 wt.-%
3-phenylpropan-1-ol: 1 wt.-%
6,6-dimethyl-2-methylenebicyclo[3.1.1]heptane: 0.5 wt.-%
3-(6,6-dimethylbicyclo[3.1.1]hept-2-en-2-yl)propanal: 0.1 wt.-%
(2E,5E)-5,6,7-trimethylocta-2,5-dien-4-one: 2 wt.-%
1-methyl-4-(4-methylpent-3-en-1-yl)cyclohex-3-enecarbaldehyde: 2 wt.-%
3-methylbut-2-en-1-yl acetate: 10 wt.-%
4-(4-hydroxyphenyl)butan-2-one: 5 wt.-%
4-methyl-2-(2-methylprop-1-en-1-yl)tetrahydro-2H-pyran: 2 wt.-%
4-methyl-2-phenyl-3,6-dihydro-2H-pyran: 2 wt.-%
3-methyl-5-(2,2,3-trimethylcyclopent-3-en-1-yl)pentan-2-ol: 10 wt.-%
ethyl (Z)-2-acetyl-4-methyltridec-2-enoate: 0.5 wt.-%
4-(dodecylthio)-4-methylpentan-2-one: 0.5 wt.-%
cyclopentadecanone, hexadecanolide: 20 wt.-%
1-phenylethyl acetate: 5 wt.-%
(E)-6-ethyl-3-methyloct-6-en-1-ol: 2 wt.-%
(E)-2-((3,5-dimethylhex-3-en-2-yl)oxy)-2-methylpropyl cyclopropanecarboxylate: 5 wt.-%
1-methyl-4-propan-2-ylcyclohexa-1,4-diene: 5 wt.-%
2-(4-methyl-1-cyclohex-3-enyl)propan-2-ol: 1 wt.-%
2-(4-methylcyclohex-3-en-1-yl)propan-2-ol: 25 wt.-%
1-methyl-4-(propan-2-ylidene)cyclohex-1-ene: 15 wt.-%
2-(4-methyl-1-cyclohex-3-enyl)propan-2-yl acetate: 25 wt.-%
3,7-dimethyloctan-3-ol: 50 wt.-%
oxacyclohexadecan-2-one: 10 wt.-%
2-isopropyl-5-methylphenol: 10 wt.-%
1-(cyclopropylmethyl)-4-methoxybenzene: 10 wt.-%
(E)-tridec-2-enenitrile: 15 wt.-%
3-phenylbutanal: 5 wt.-%
3-(benzo[d][1,3]dioxol-5-yl)-2-methylpropanal: 5 wt.-%
undecan-2-one: 0.1 wt.-%
(3E,5Z)-undeca-1,3,5-triene: 0.1 wt.-%
(E)-4-methyldec-3-en-5-ol: 25 wt.-%
4-hydroxy-3-methoxybenzaldehyde: 5 wt.-%
(Z)-cyclohexadec-5-enone: 0.1 wt.-%
(2E,6Z)-nona-2,6-dienenitrile: 0.1 wt.-%
2-methoxynaphtalene: 15 wt.-%

It has been found that keeping the concentrations below the provided maxima leads to improved results with regard to the olfactive perception of the perfume composition and its suitability for encapsulation.

In a preferred embodiment of the present invention, the perfume composition comprises, preferably consists of, ADOXAL (2,6,10-trimethylundec-9-enal); AGRUMEX (2-(tert-butyl)cyclohexyl acetate); ALDEHYDE C 12 MNA (2-methylundecanal); ALLYL AMYL GLYCOLATE (prop-2-enyl 2-(3-methylbutoxy)acetate); ALLYL CAPROATE (prop-2-enyl hexanoate); ALLYL CYCLOHEXYL PROPIONATE (prop-2-enyl 3-cyclohexylpropanoate); ALLYL OENANTHATE (prop-2-enyl heptanoate); AMYL BUTYRATE (pentyl butanoate); AMYL CINNAMIC ALDEHYDE ((Z)-2-benzylideneheptanal); APHERMATE (1-(3,3-dimethylcyclohexyl)ethyl formate); BENZYL ACETATE (benzyl acetate); BENZYL ACETONE (4-phenylbutan-2-one); BICYCLO NONALACTONE (octahydro-2H-chromen-2-one); BUTYL ACETATE (butyl acetate); BUTYL CYCLOHEXYL ACETATE PARA (4-(tert-butyl) cyclohexyl acetate); CETONE V ((E)-1-(2,6,6-trimethylcyclohex-2-en-1-yl)hepta-1,6-dien-3-one); DAMASCENONE ((E)-1-(2,6,6-trimethylcyclohexa-1,3-dien-1-yl)but-2-en-1-one); DAMASCONE ALPHA ((E)-1-(2,6,6-trimethylcyclohex-2-en-1-yl)but-2-en-1-one); DECALACTONE GAMMA (5-hexyloxolan-2-one); DIMETHYL BENZYL CARBINYL ACETATE (2-methyl-1-phenylpropan-2-yl acetate); DIMETHYL BENZYL CARBINYL BUTYRATE (2-methyl-1-phenylpropan-2-yl butanoate); ESTERLY (ethyl cyclohexyl carboxylate); ETHYL ACETATE (ethyl acetate); ETHYL ACETOACETATE (ethyl 3-oxobutanoate); ETHYL HEXANOATE (ethyl hexanoate); ETHYL METHYL-2-BUTYRATE (ethyl 2-methylbutanoate); ETHYL OENANTHATE (ethyl heptanoate); FRUTONILE (2-methyldecanenitrile); GERANYL ACETATE ((E)-3,7-dimethylocta-2,6-dien-1-yl acetate); HEXENYL-3-CIS ACETATE ((Z)-hex-3-en-1-yl acetate); HEXENYL-3-CIS ISOBUTYRATE ((Z)-hex-3-en-1-yl 2-methylpropanoate); HEXYL ACETATE (hexyl acetate); HEXYL ISOBUTYRATE (hexyl 2-methylpropanoate); ISOAMYL ACETATE EXTRA (3-methylbutyl acetate); ISOPROPYL METHYL-2-BUTYRATE (isopropyl 2-methylbutanoate); JASMONYL (3-butyl-5-methyltetrahydro-2H-pyran-4-yl acetate); LIFFAROME ((Z)-hex-3-en-1-yl methyl carbonate); MANZANATE (ethyl 2-methylpentanoate); METHYL HEPTENONE (6-methylhept-5-en-2-one); METHYL LAITONE (8-methyl-1-oxaspiro[4.5]decan-2-one); NECTARYL (2-(2-(4-methylcyclohex-3-en-1-yl)propyl)cyclopentanone); NEOFOLIONE ((E)-methyl non-2-enoate); NEROLIDOL ((E)-3,7,11-trimethyldodeca-1,6,10-trien-3-ol); NERYL ACETATE HC ((Z)-3,7-dimethylocta-2,6-dien-1-yl acetate); NONALACTONE GAMMA (5-pentyloxolan-2-one); ORANGER CRYSTALS (1-(2-naphtalenyl)-ethanone); PEACH PURE (5-heptyldihydrofuran-2(3H)-one); PHENOXY ETHYL ISOBUTYRATE (2-(phenoxy) ethyl 2-methylpropanoate); PHENYL ETHYL ACETATE (2-phenylethyl acetate); POMAROSE ((2E,5E)-5,6,7-trimethylocta-2,5-dien-4-one); PRENYL ACETATE (3-methylbut-2-en-1-yl acetate); RASPBERRY KETONE (4-(4-hydroxyphenyl)butan-2-one); SCENTAURUS CLEAN (ethyl (Z)-2-acetyl-4-methyltridec-2-enoate); SCENTAURUS JUICY (4-(dodecylthio)-4-methylpentan-2-one); SYLKOLIDE ((E)-2-((3,5-dimethylhex-3-en-2-yl)oxy)-2-methylpropylcyclopropane-carboxylate); and METHYL NONYL KETONE (undecan-2-one). Those ingredients are particularly suitable for providing a perfume with a fruity character.

In a preferred embodiment of the present invention, the perfume composition comprises, preferably consists of, ACETOPHENONE EXTRA (1-phenylethanone); ALDEHYDE C 11 MOA (2-methyldecanal); ALDEHYDE C 11 UNDECYLENIC (undec-10-enal); ALDEHYDE ISO C 11 ((E)-undec-9-enal); AMYL CINNAMIC ALDEHYDE ((Z)-2-benzylideneheptanal); AMYL SALICYLATE (pentyl 2-hydroxybenzoate); AUBEPINE PARA-CRESOL (4-methoxybenzaldehyde); AURANTIOL PURE ((E)-methyl 2-((7-hydroxy-3,7-dimethyloctylidene)amino)benzoate); BENZALDEHYDE (benzaldehyde); BENZYL ACETATE EXTRA (benzyl acetate); BENZYL ACETONE (4-phenylbutan-2-one); BENZYL ALCOHOL EXTRA (phenylmethanol); BENZYL BENZOATE (benzyl benzoate); BENZYL CINNAMATE (benzyl 3-phenylprop-2-enoate); BENZYL SALICYLATE (benzyl 2-hydroxybenzoate); BOURGEONAL (3-(4-(tert-butyl)phenyl)propanal); CETONE V ((E)-1-(2,6,6-trimethylcyclohex-2-en-1-yl) hepta-1,6-dien-3-one); CIS-3-HEXENOL ((Z)-hex-3-en-1-ol); CIS JASMONE ((Z)-3-methyl-2-(pent-2-en-1-yl)cyclopent-2-enone); CITRONELLOL EXTRA (3,7-dimethyloct-6-en-1-ol); CITRONELLYL ACETATE (3,7-dimethyloct-6-en-1-yl acetate); CITRONELLYL FORMATE (3,7-dimethyloct-6-en-1-yl formate); CORANOL (4-cyclohexyl-2-methylbutan-2-ol); CRESYL METHYL ETHER PARA (1-methoxy-4-methylbenzene); CYCLAMEN ALDEHYDE EXTRA (3-(4-isopropylphenyl)-2-methylpropanal); DAMASCENONE GIV ((E)-1-(2,6,6-trimethylcyclohexa-1,3-dien-1-yl)but-2-en-1-one); DAMASCONE ALPHA ((E)-1-(2,6,6-trimethylcyclohex-2-en-1-yl)but-2-en-1-one); DECALACTONE GAMMA (5-hexyloxolan-2-one); DECENAL-4-TRANS ((E)-dec-4-enal); DIHYDRO MYRCENOL (2,6-dimethyloct-7-en-2-ol); DIMETHYL BENZYL CARBINYL ACETATE (2-methyl-1-phenylpropan-2-yl acetate); DIMETHYL BENZYL CARBINYL BUTYRATE (2-methyl-1-phenylpropan-2-yl butanoate); DIMETOL (2,6-dimethylheptan-2-ol); DIPHENYL OXIDE (oxydibenzene); ETHYL LINALOOL ((E)-3,7-dimethylnona-1,6-dien-3-ol); FENNALDEHYDE (3-(4-methoxyphenyl)-2-methylpropanal); FLORHYDRAL (3-(3-isopropylphenyl)butanal); FLOROSA HC (tetrahydro-4-methyl-2-(2-methylpropyl)-2H-pyran-4-ol); GERANIOL ((E)-3,7-dimethylocta-2,6-dien-1-ol); GERANYL ACETATE SYNTHETIC ((E)-3,7-dimethylocta-2,6-dien-1-yl acetate); GERANYL ACETONE ((E)-6,10-dimethylundeca-5,9-dien-2-one); HEDIONE (methyl 3-oxo-2-pentylcyclopentaneacetate); HELIOTROPINE CRYSTALS (benzo[d][1,3] dioxole-5-carbaldehyde); HEXENYL-3-CIS SALICYLATE ((Z)-hex-3-en-1-yl 2-hydroxybenzoate); HEXYL CINNAMIC ALDEHYDE ((E)-2-benzylideneoctanal); HEXYL ISOBUTYRATE (hexyl 2-methylpropanoate); HEXYL SALICYLATE (hexyl 2-hydroxybenzoate); HYDROXYCITRONELLAL SYNTHETIC (7-hydroxy-3,7-dimethyloctanal); INDOLE PURE (1H-indole); IONONE BETA ((E)-4-(2,6,6-trimethylcyclohex-1-en-1-yl)but-3-en-2-one); IRISONE ALPHA ((E)-4-(2,6,6-trimethylcyclohex-2-en-1-yl)but-3-en-2-one); ISORALDEINE 70 ((E)-3-methyl-4-(2,6,6-trimethylcyclohex-2-en-1-yl)but-3-en-2-one); JASMONE CIS ((Z)-3-methyl-2-(pent-2-en-1-yl) cyclopent-2-enone); JASMONYL (3-butyl-5-methyltetrahydro-2H-pyran-4-yl acetate); JASMOPYRANE FORTE (3-pentyltetrahydro-2H-pyran-4-yl acetate); LILIAL (3-(4-(tert-butyl)phenyl)-2-methylpropanal); LINALOOL OXIDE (2-(5-methyl-5-vinyltetrahydrofuran-2-yl)propan-2-ol); LINALOOL SYNTHETIC (3,7-dimethylocta-1,6-dien-3-ol); LINALYL ACETATE SYNTHETIC (3,7-dimethylocta-1,6-dien-3-yl acetate); MAHONIAL ((4E)-9-hydroxy-5,9-dimethyl-4-decenal); MAYOL ((4-isopropylcyclohexyl)methanol); MEFROSOL (3-methyl-5-phenylpentan-1-ol); METHYL ANTHRANILATE EXTRA (methyl 2-aminobenzoate); METHYL BENZOATE (methyl benzoate); METHYL DIHYDRO ISOJASMONATE (methyl 2-hexyl-3-oxocyclopentane-1-carboxylate); METHYL SALICYLATE (methyl 2-hydroxybenzoate); MYRALDENE (4-(4-methylpent-3-en-1-yl)cyclohex-3-enecarbaldehyde); NEROLEX ((2Z)-3,7-dimethylocta-2,6-dien-1-ol); NEROLIDOL SYNTHETIC ((E)-3,7,11-trimethyldodeca-1,6,10-trien-3-ol); NEROLINE CRYSTALS (2-ethoxynaphthalene); NERYL ACETATE HC ((Z)-3,7-dimethylocta-2,6-dien-1-yl acetate); NONADIENAL ((2E,6Z)-nona-2,6-dienal); NONADIENOL-2,6 ((2Z,6E)-2,6-nonadien-1-ol); NONENAL-6-CIS ((Z)-non-6-enal); NONENOL-6-CIS ((Z)-non-6-en-1-ol); NOPYL ACETATE (2-(6,6-dimethylbicyclo[3.1.1]hept-2-en-2-yl) ethyl acetate); NYMPHEAL (3-(4-(2-methylpropyl)-2-methylphenyl)propanal); ORANGER CRYSTALS (1-(2-naphtalenyl)-ethanone); PANDANOL ((2-methoxyethyl) benzene); PELARGOL (3,7-dimethyloctan-1-ol); PHARAONE (2-cyclohexylhepta-1,6-dien-3-one); PHENOXY ETHYL ISOBUTYRATE (2-(phenoxy)ethyl 2-methylpropanoate); PHENYL ACETALDEHYDE (2-phenyl-ethanal); PHENYL ETHYL ACETATE (2-phenylethyl acetate); PHENYL ETHYL ALCOHOL (2-phenylethanol); PHENYL ETHYL ISOBUTYRATE (2-phenylethyl 2-methylpropanoate); PHENYL ETHYL PHENYL ACETATE (2-phenylethyl 2-phenylacetate); PHENYL PROPYL ALCOHOL (3-phenylpropan-1-ol); POMAROSE ((2E,5E)-5,6,7-trimethylocta-2,5-dien-4-one); RASPBERRY KETONE (4-(4-hydroxyphenyl)butan-2-one); ROSE OXIDE CO (4-methyl-2-(2-methylprop-1-en-1-yl) tetrahydro-2H-pyran); ROSYRANE SUPER (4-methyl-2-phenyl-3,6-dihydro-2H-pyran); STYRALLYL ACETATE (1-phenylethyl acetate); SUPER MUGUET ((E)-6-ethyl-3-methyloct-6-en-1-ol); SYLKOLIDE ((E)-2-((3,5-dimethylhex-3-en-2-yl)oxy)-2-methylpropyl cyclopropanecarboxylate); TERPINEOL PURE (2-(4-methylcyclohex-3-en-1-yl) propan-2-ol); TERPINYL ACETATE (2-(4-methyl-1-cyclohex-3-enyl)propan-2-yl acetate); TETRAHYDRO LINALOOL (3,7-dimethyloctan-3-ol); TRIFERNAL (3-phenylbutanal); TROPIONAL (3-(benzo[d][1,3]dioxol-5-yl)-2-methylpropanal); VIOLET NITRILE ((2E,6Z)-nona-2,6-dienenitrile); YARA YARA (2-methoxynaphtalene). Those ingredients are particularly suitable for providing a perfume with a floral character.

In a preferred embodiment of the present invention, the perfume composition comprises, preferably consists of, ADOXAL (2,6,10-trimethylundec-9-enal); ALCOHOL C 6 HEXYLIC (hexan-1-ol); ALDEHYDE C 10 DECYLIC (decanal); ALDEHYDE C 11 MOA (2-methyldecanal); ALDEHYDE C 11 UNDECYLENIC (undec-10-enal); ALDEHYDE C 110 UNDECYLIC (undecanal); ALDEHYDE C 12 LAURIC (dodecanal); ALDEHYDE C 12 MNA PURE (2-methylundecanal); ALDEHYDE C 6 HEXYLIC FOOD GRADE (hexan-1-al); ALDEHYDE C 8 OCTYLIC FOOD GRADE (octanal); ALDEHYDE C 9 ISONONYLIC (3,5,5-trimethylhexanal); ALDEHYDE C 9 NONYLIC FOOD GRADE (nonanal); ALDEHYDE C 10 DECYLIC (decanal); ALDEHYDE C 11 UNDECYLENIC (undec-10-enal); ALDEHYDE C 12 MNA PURE (2-methylundecanal); ALDEHYDE ISO C 11 ((E)-undec-9-enal); CITRAL TECH ((E)-3,7-dimethylocta-2,6-dienal); CITRONELLAL SYNTHETIC (3,7-dimethyloct-6-enal); CITRONELLOL EXTRA (3,7-dimethyloct-6-en-1-ol); CITRONELLYL ACETATE (3,7-dimethyloct-6-en-1-yl acetate); CITRONELLYL FORMATE (3,7-dimethyloct-6-en-1-yl formate); CITRONELLYL NITRILE (3,7-dimethyloct-6-enenitrile); CLONAL (dodecanenitrile); DECENAL-4-TRANS ((E)-dec-4-enal); DIHYDRO MYRCENOL (2,6-dimethyloct-7-en-2-ol); DODECENAL 10%/TEC ((E)-dodec-2-enal); FLORHYDRAL (3-(3-isopropylphenyl) butanal); HEXENAL-2-TRANS ((E)-hex-2-enal); HYDROXYCITRONELLAL SYNTHETIC (7-hydroxy-3,7-dimethyloctanal); LIMONENE, LIMONENE LAEVO, LIMONENE DEXTRO (1-methyl-4-prop-1-en-2-yl-cyclohexene); MELONAL (2,6-dimethylhept-5-enal); NEROLEX ((2Z)-3,7-dimethylocta-2,6-dien-1-ol); and TERPINOLENE (1-methyl-4-(propan-2-ylidene)cyclohex-1-ene). Those ingredients are particularly suitable for providing a perfume with a citrus-aldehydic character.

In a preferred embodiment of the present invention, the perfume composition comprises, preferably consists of, ALLYL AMYL GLYCOLATE (prop-2-enyl 2-(3-methylbutoxy)acetate); AMYL BUTYRATE (pentyl butanoate); ANETHOLE SYNTHETIC ((E)-1-methoxy-4-(prop-1-en-1-yl)benzene); ANISYL ACETATE (4-methoxybenzyl acetate); APHERMATE (1-(3,3-dimethylcyclohexyl)ethyl formate); BORNEOL CRYSTALS ((1S,2S,4S)-1,7,7-trimethylbicyclo[2.2.1]heptan-2-ol); BORNYL ACETATE LIQUID ((2S,4S)-1,7,7-trimethylbicyclo[2.2.1]heptan-2-yl acetate); CAMPHOR SYNTHETIC ((1S,4S)-1,7,7-trimethylbicyclo[2.2.1]heptan-2-one); CARVONE LAEVO ((5R)-2-methyl-5-prop-1-en-2-ylcyclohex-2-en-1-one); CIS-3-HEXENOL ((Z)-hex-3-en-1-ol); DIHYDRO MYRCENOL (2,6-dimethyloct-7-en-2-ol); DIMETOL (2,6-dimethylheptan-2-ol); DIPHENYL OXIDE (oxydibenzene); EUCALYPTOL NATURAL ((1s,4s)-1,3,3-trimethyl-2-oxabicyclo [2.2.2]octane); EUGENOL (4-allyl-2-methoxyphenol); FENCHYL ALCOHOL ((1S,2R,4R)-1,3,3-trimethylbicyclo [2.2.1]heptan-2-ol); FENNALDEHYDE (3-(4-methoxyphenyl)-2-methylpropanal); FRESKOMENTHE (2-(sec-butyl) cyclohexanone); GALBANONE PURE (1-(5,5-dimethylcyclohex-1-en-1-yl)pent-4-en-1-one); HEXENOL-3-CIS ((Z)-hex-3-en-1-ol); HEXENYL-3-CIS ACETATE ((Z)-hex-3-en-1-yl acetate); HEXENYL-3-CIS ISOBUTYRATE ((Z)-hex-3-en-1-yl 2-methylpropanoate); HEXENYL-3-CIS SALICYLATE ((Z)-hex-3-en-1-yl 2-hydroxybenzoate); HEXYL ISOBUTYRATE (hexyl 2-methylpropanoate); ISOMENTHONE DL (2-isopropyl-5-methylcyclohexanone); ISOPROPYL METHYL-2-BUTYRATE (isopropyl 2-methylbutanoate); JASMONE CIS ((Z)-3-methyl-2-(pent-2-en-1-yl)cyclopent-2-enone); LIFFAROME GIV ((Z)-hex-3-en-1-yl methyl carbonate); LINALYL ACETATE SYNTHETIC (3,7-dimethylocta-1,6-dien-3-yl acetate); MANZANATE (ethyl 2-methylpentanoate); MENTHOL, MENTHOL LAEVO, MENTHOL RACEMIC (2-isopropyl-5-methylcyclohexanol); MENTHONE, ISOMENTHONE, MENTHONE LAEVO, MENTHONE RACEMIC (2-isopropyl-5-methylcyclohexanone); METHYL OCTYNE CARBONATE (methyl non-2-ynoate); MYRCENE 90 (7-methyl-3-methyleneocta-1,6-diene); NEOFOLIONE ((E)-methyl non-2-enoate); NONADIENAL ((2E,6Z)-nona-2,6-dienal); NONADIENOL-2,6 ((2Z,6E)-2,6-nonadien-1-ol); NONALACTONE GAMMA (5-pentyloxolan-2-one); NONENAL-6-CIS ((Z)-non-6-enal); NONENOL-6-CIS ((Z)-non-6-en-1-ol); NOPYL ACETATE (2-(6,6-dimethylbicyclo[3.1.1]hept-2-en-2-yl) ethyl acetate); PANDANOL ((2-methoxyethyl)benzene); PINENE BETA (6,6-dimethyl-2-methylenebicyclo[3.1.1] heptane); PINOACETALDEHYDE (3-(6,6-dimethylbicyclo[3.1.1]hept-2-en-2-yl)propanal); TERPINEOL ALPHA (2-(4-methyl-1-cyclohex-3-enyl)propan-2-ol); TERPINEOL PURE (2-(4-methylcyclohex-3-en-1-yl)propan-2-ol); TERPINOLENE (1-methyl-4-(propan-2-ylidene)cyclohex-1-ene); TERPINYL ACETATE (2-(4-methyl-1-cyclohex-3-enyl)propan-2-yl acetate); THYMOL (2-isopropyl-5-methylphenol); TOSCANOL (1-(cyclopropylmethyl)-4-methoxybenzene); TRIDECENE-2-NITRILE ((E)-tridec-2-enenitrile); UNDECATRIENE ((3E,5Z)-undeca-1,3,5-triene); UNDECAVERTOL ((E)-4-methyldec-3-en-5-ol); VANILLIN (4-hydroxy-3-methoxybenzaldehyde); and VIOLET NITRILE ((2E,6Z)-nona-2,6-dienenitrile). Those ingredients are particularly suitable for providing a perfume with a green-aromatic character.

Furthermore, each of the biodegradable ingredient(s) mentioned herein above can be present at a concentration equal to or higher than the minimum concentration of 0.01 wt.-%, preferably 0.02 wt.-%, more preferably 0.05 wt.-%, even more preferably 0.1 wt.-%, even still more preferably 0.5 wt.-%.

The water-soluble matrix can comprise at least one material selected from the group consisting of starch, in particular water-soluble modified starch, maltodextrin, mannitol, chitosan, gum Arabic, alginate, cellulose, pectins, gelatin, polyvinyl alcohol and mixtures thereof. The resulting perfume encapsulates are facile and cost-effective in manufacture. Furthermore, they are prepared of naturally-based materials, which are non-toxic and biodegradable. Such encapsulates therefore have an increased consumer-appeal.

When the starch is a water-soluble modified starch, such starch can be made from raw starch or pre-gelatinized starch. It can be derived from tubers, legumes, cereals and grains, for example corn starch, wheat starch, rice starch, waxy corn starch, oat starch, cassava starch, waxy barley starch, waxy rice starch, sweet rice starch, amioca starch, potato starch, tapioca starch and mixtures thereof.

The water-soluble modified starch can be selected from the group consisting of bleached starch, hydroxypropyl starch, hydroxypropyl distarch phosphate, dydroxypropyl distarch glycerol, acetylated distarch phosphate, starch acetate esterified with acetic anhydride, starch acetate esterified with vinyl acetate, acetylated distarch adipate, acetylated distarch glycerol, starch sodium octenyl succinate and mixtures thereof.

Water-soluble modified starches have emulsifying and emulsion-stabilizing capacity. They have the ability to entrap perfume droplets in the form of oil-in-water emulsions due to the hydrophobic character of the starch modifying agent. The modified starches as described herein above bring numerous advantages including high emulsification and encapsulation performance, low viscosity, even at high solids content, and excellent oxidation resistance to ensure good fragrance and/or cosmetic preservation and stabilization of sensitive ingredients.

When the water-soluble matrix comprises a water-soluble modified starch, it can additionally comprise a material selected from the group consisting of maltodextrin, mannitol and mixtures thereof. Maltodextrin and mannitol both increase the glass transition temperature of the matrix. Furthermore, maltodextrin is a film forming agent.

Maltodextrins are characterized by their dextrin equivalent (DE). The higher the DE, the lower is the molecular weight of the maltodextrin. In the context of the present invention, maltodextrin having different DE may be combined to provide optimized encapsulation properties. Without being bound by any theory, it is supposed that mixtures of low and high DE maltodextrins improve the packing of the water-soluble matrix.

Further to the materials stated herein above, the water-soluble matrix can additionally comprise a hemicellulose. In the context of the present invention, the expression "hemicellulose" is to be understood as a polysaccharide selected from the group consisting of glucans, in particular xyloglucans, mannans, in particular glucomannans, and xylans, in particular arabinoxylans and glucuronoxylans.

It has been found that addition of a hemicellulose to a water-soluble matrix, in particular a starch matrix, leads to a modification of the matrix, improving its perfume release properties under moisture and mechanical (e.g. friction) activation.

The hemicellulose is preferably a xyloglucan, in particular a xyloglucan obtainable from tamarind seeds. Xyloglucans are the most abundant hemicellulose in the primary walls of non-graminaceous plants, often comprising 20 wt.-% of the dry mass of the wall. A xyloglucan has a backbone composed of 1,4-linked β-D-glucose residues. Up to 75% of the backbone residues are substituted at C6 with mono-, di-, or trisaccharide sidechains. Preferably, the hemicellulose is a xyloglucan obtainable from tamarind seeds, in particular obtained from tamarind seeds, also known as "tamarind kernel powder" or "tamarind gum". In tamarind gum, the side chains consist of one or two α-D-xylopyranosyl units, optionally capped with β-D-galactopyranosyl, α-L-arabinofuranosyl or β-D-xylopyranosyl.

In context of the present invention, the perfume composition can be at least partially encapsulated in core-shell microcapsules comprising a core and a shell surrounding the core.

Such compositions allow for fragrance release either through activation by mechanical action or by moisture, for instance in deodorant or antiperspirant applications. But such compositions are also particularly useful when employed as perfume delivery means in consumer products that require, for delivering optimal perfumery benefits, core-shell microcapsules to adhere to a substrate on which they are applied, for instance laundry detergents.

In a particular embodiment of the present invention, the perfume composition can be fully encapsulated in the core-shell microcapsules. Such a powder encapsulate is expected to release virtually no odor at rest or when exposed to moisture, and to release a boost of odor when submitted to a mechanical stress.

When the perfume composition is only partially encapsulated in core-shell microcapsules, the composition of perfume ingredients that is encapsulated in the core-shell microcapsules and the composition of perfume ingredients that is not encapsulated in the core-shell microcapsules can be the same or different. This results in a modulated release of the same or of different odor impressions, depending on whether the encapsulate is exposed to moisture or mechanical stresses. In particular, a sequential release of the perfume ingredients may be envisioned.

In context of the present invention, the shell the core-shell of the microcapsules can be made of a biodegradable material or a non-biodegradable material. In particular, the shell of the core-shell microcapsules can comprise a polymer selected from the group consisting of a melamine-formaldehyde polymer, an urea-formaldehyde polymer, a polyurea, a polyurethane, a polyamide, a polyacrylate, a polycarbonate, and mixtures thereof.

Core-shell microcapsules with a shell of a melamine-formaldehyde polymer have proven to be particularly suitable for fragrance encapsulation. They are described in the prior art, for instance in WO 2008/098387 A1, WO 2016/207180 A1 and WO 2017/001672 A1.

Also core-shell microcapsules with a shell of a polyurea or polyurethane polymer have been successfully used for perfume encapsulation. They have the advantage to address consumer concerns with regard to residual formaldehyde in the composition. Such capsules are also described in the prior art, for instance in WO 2019/174978 A1.

Core-shell microcapsules with a shell of a polyacrylate, i.e. one or more monoethylenically unsaturated and/or polyethylenically unsaturated monomer(s) in polymerized form, have also been successfully used for perfume encapsulation. Such capsules are described in the prior art, for instance in WO 2013/111912 A1 or WO 2014/032920 A1.

As a further alternative, the shell of the core-shell microcapsules can comprise a polymeric stabilizer that is formed by combination of a polymeric surfactant with at least one aminosilane.

The shell can then additionally comprise a polysaccharide, preferably a polysaccharide comprising beta (1→4) linked monosaccharide units, even more preferably a cellulose derivative, in particular selected form the group consisting of hydroxyethyl cellulose, hydroxypropylmethyl cellulose, cellulose acetate and carboxymethyl cellulose, preferably hydroxyethyl cellulose.

The term "polymeric surfactant" refers to a polymer or a mixture comprising at least one polymer that has the property of lowering the interfacial tension between an oil phase and an aqueous phase, when dissolved in one or both of the phases. This ability to lower interfacial tension is called "interfacial activity".

The term "formed by combination" in the present context means that the polymeric surfactant and the at least one aminosilane are brought in contact with each other to generate the polymeric stabilizer. Without being bound to any theory, this formation can be the result of an interaction between the polymeric surfactant and the at least one aminosilane, such as through dispersion forces, electrostatic forces or hydrogen bonds. But also a chemical reaction, in strict sense, to form covalent bonds is encompassed by this term.

In other words, the polymeric stabilizer can be regarded as an assembly, which comprises moieties derived from a polymeric surfactant and moieties derived from at least one aminosilane.

The polymeric surfactant is soluble or dispersible in an aqueous phase or in water, respectively. This means that the individual polymeric surfactant macromolecules are substantially separated from each other in these liquids. The resulting system appears transparent or hazy when inspected by the human eye.

The polymeric stabilizer can be a relevant factor to the balance between core-shell microcapsule stability with respect to both perfume leakage during storage and perfume release under in-use conditions. In particular, the importance of providing additional stabilization of the oil-water interface has been recognized. The polymeric stabilizer thus provides a stable platform, which allows for the addition of additional shell materials and/or shell precursors to form encapsulated perfume compositions. More specifically, the addition of a polysaccharide, preferably a polysaccharide comprising beta (1→4) linked monosaccharide units, even more preferably a cellulose derivative, leads to highly sustainable microcapsules with an excellent release profile.

The polysaccharide may be deposited on the outer surface of the core-shell microcapsule shell formed by the polymeric stabilizer. This results in a multilayer shell having at least one layer of polymeric stabilizer and one layer of polysaccharide. It may improve the imperviousness of the encapsulating shell by increasing the amount of encapsulating material.

To avoid any ambiguity, this aspect of the present invention is by no means restricted to a core-shell microcapsule shell having sharply defined discrete layers, although this is one possible embodiment. More specifically, the layers can also be gradual and undiscrete. On the other hand, and at the other extreme, the shell can even be essentially homogenous.

The polysaccharide may react with unreacted groups of the polymeric stabilizer and increase the density of the cross-linked core-shell microcapsule shell. But the polysaccharide may also interact with the polymeric stabilizer by physical forces, physical interactions, such as hydrogen bonding, ionic interactions, hydrophobic interactions or electron transfer interactions.

The core-shell microcapsule shell additionally comprising a polysaccharide can be further stabilized with a stabilizing agent. Preferably the stabilizing agent comprises at least two carboxylic acid groups. Even more preferably, the stabilizing agent is selected from the group consisting of citric acid, benzene-1,3,5-tricarboxylic acid, 2,5-furandicarboxylic acid, itaconic acid, poly(itaconic acid) and combinations thereof.

In a particular embodiment of the present invention, the polymeric surfactant comprises, in particular consists of, a polysaccharide comprising carboxylic acid groups. It has been found that combining such a polymeric surfactant with at least one aminosilane results in the formation of a polymeric stabilizer, which is more sustainable than stabilizers known in the prior art, particular in terms of environment and resources protection. Without being bound by any theory, it is surmised that the carboxylic acid groups may interact with the at least one aminosilane in a manner mentioned hereinabove.

The polysaccharide comprising carboxylic acid groups may comprise uronic acid units, in particular hexuronic acid units. Polysaccharides having uronic acid units, in particular hexuronic acid units, are broadly available in nature.

The hexuronic acid units can be selected from the group consisting of galacturonic acid units, glucuronic acid units, in particular 4-O-methyl-glucuronic acid units, guluronic acid units and mannuronic acid units.

The polysaccharide comprising carboxylic acid groups may be branched. Branched polysaccharides comprising carboxylic acid groups have the advantage of forming more compact networks than linear polysaccharides and therefore may favor the imperviousness of the encapsulating shell, resulting in reduced leakage and greater encapsulation efficiency.

The polymeric surfactant can be selected from pectin, gum Arabic and an alginate. As illustrated in the examples, these polysaccharides offer a most suitable combination of solubility, viscosity and interfacial activity that make the microcapsules according to the invention particularly performing in terms of handling, storage stability and olfactive performance. The polymeric surfactant may also be hyaluronic acid.

The aminosilane employed in the formation of the polymeric stabilizer can be selected from a compound of Formula (I).

Formula (I)

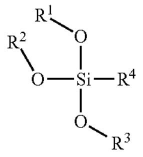

In the above Formula (I), $R^1$, $R^2$ and $R^3$ are each independently $C_1$-$C_4$ linear or branched alkyl or alkenyl residues, in particular methyl or ethyl, and $R^4$ is a $C_1$-$C_{12}$, preferably a $C_1$-$C_4$, linear or branched alkyl or alkenyl residue comprising an amine functional group, in particular a primary, secondary or tertiary amine.

When the functional group is a primary amine, it can be a terminal primary amine. $R^4$ is then preferably a $C_1$-$C_8$, even more preferably a $C_1$-$C_4$, linear terminal primary aminoalkyl residue. Specific aminosilanes of this category are selected from the group consisting of aminomethyltriethoxysilane, 2-aminoethyltriethoxysilane, 3-aminopropyltriethoxysilane, 4-aminobutyltri-ethoxysilane, 5-aminopentyltriethoxysilane, 6-aminohexyltriethoxysilane, 7-aminohptyltriethoxysilane and 8-aminooctyltriethoxysilane.

Without being bound by any theory, it is surmised that the silane groups polycondensate with one another to form a silica network at a liquid-liquid interface that additionally stabilizes this interface.

The aminosilane can be a bipodal aminosilane. By "bipodal aminosilane" is meant a molecule comprising at least one amino group and two residues, each of these residues bearing at least one alkoxysilane moiety.

In particular embodiments of the present invention, the at least one bipodal aminosilane has the Formula (II).

Formula (II)

$$(O\text{-}R^3)_{(3\text{-}f)}(R^2)_f Si —R^2—X—R^2—Si(O\text{-}R^4)_{(3\text{-}f)}(R^3)_f$$

In the above Formula (II), X stands for $—NR^1—$, $—NR^1—CH_2—NR^1—$, $—NR^1—CH_2—CH_2—NR^1—$, $—NR^1—CO—NR^1—$, or

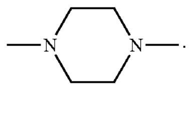.

In the above Formula (II), $R^1$ each independently stand for H, $CH_3$ or $C_2H_5$. $R^2$ each independently stand for a linear or branched alkylene group with 1 to 6 carbon atoms. $R^3$ each independently stand for a linear or branched alkyl group with 1 to 4 carbon atoms. $R^4$ each independently stand for H or for a linear or branched alkyl group with 1 to 4 carbon atoms. f stands for 0, 1 or 2.

Bipodal aminosilanes are particularly advantageous for forming stable oil-water interfaces, compared to conventional silanes.

Examples of bipodal aminosilanes include, but are not limited to, bis(3-(triethoxysilyl)propyl)amine, N,N'-bis(3-(trimethoxysilyl)propyl)urea, bis(3-(methyldiethoxysilyl) propyl)amine, N,N'-bis(3-(trimethoxysilyl)propyl) ethane-1, 2-diamine, bis(3-(methyldimethoxysilyl)propyl)-N-methylamine and N,N'-bis(3-(triethoxysilyl) propyl)piperazine.

The bipodal aminosilane can be a secondary aminosilane. Using a secondary bipodal aminosilane instead of primary aminosilane decreases the reactivity of the polymeric stabilizer with respect to electrophilic species, in particular aldehydes. Hence, benefit agents containing high levels of aldehydes may be encapsulated with a lower propensity for adverse interactions between core-forming and shell-forming materials.

The secondary bipodal aminosilane can be bis(3-(triethoxysilyl)propyl)amine. This particular secondary aminosilane has the advantage of releasing ethanol instead of more toxic and less desirable methanol during the polycondensation of the ethoxysilane groups.

Other aminosilanes may also be used in combination with the aforementioned bipodal aminosilanes, in particular the aminosilanes described hereinabove.

The aminosilane to polymeric surfactant weight ratio can be from 0.1 to 1.1, in particular from 0.2 to 0.9, even more particularly from 0.3 to 0.7, for example 0.5.

The polymeric stabilizer can be formed by combination of a polymeric surfactant with at least one aminosilane and further a polyfunctional isocyanate. Polyfunctional isocyanates may densify the arrangement of the polymeric surfactant at the oil/water interface. Without being bound by any theory, it is supposed that the polyfunctional isocyanate cross-links both aminosilanes and polysaccharides by forming polyurea and polyurethane bonds.

The polyfunctional isocyanate may be selected from alkyl, alicyclic, aromatic and alkylaromatic, as well as anionically modified polyfunctional isocyanates, with two or more (e.g. 3, 4, 5, etc.) isocyanate groups in a molecule.

Preferably, at least one polyfunctional isocyanate is an aromatic or an alkylaromatic polyfunctional isocyanate, the alkylaromatic polyfunctional isocyanate having preferably methylisocyanate groups attached to an aromatic ring. Both aromatic and methylisocyanate-substituted alkylaromatic polyfunctional isocyanates have a superior reactivity compared to alkyl and alicyclic polyfunctional isocyanates. Among these, 2-ethylpropane-1,2,3-triyl tris((3-(isocyanatomethyl)phenyl)carbamate) is particularly preferred, because of its tripodal nature that favors the formation of intermolecular cross-links and because of its intermediate reactivity that favors network homogeneity. This alkylaromatic polyfunctional isocyanate is commercially available under the trademark Takenate D-100 N, sold by Mitsui or under the trademark Desmodur® Quix175, sold by Covestro.

In a particularly preferred embodiment of the present invention, the polymeric stabilizer is formed by combination of pectin with bis(3-(triethoxysilyl)propyl)amine. Preferably, the polymeric stabilizer is formed by combination of pectin with bis(3-(triethoxysilyl)propyl)amine and 2-ethylpropane-1,2,3-triyl tris((3-(isocyanatomethyl)phenyl)carbamate). These combinations of natural polymeric surfactant and bipodal secondary aminosilane provide particularly advantageous interface stability and release properties. The stabilized interface is sufficiently impervious to effectively encapsulate the at least one benefit agent comprised in the core. The polymeric stabilizer effectively forms a shell encapsulating the at least one perfume ingredient comprised in the core.

As a further alternative, the core-shell microcapsule shell can comprise a complex coacervate formed of at least one protein and at least one polysaccharide. Such core-shell microcapsules have proved suitable for fragrance encapsulation and are described in the prior art, for instance in WO 1996/020612 A1, WO 2001/03825 A1 or WO 2015/150370 A1.

In a preferred embodiment of the present invention, the core-shell microcapsule shell is formed by cross-linking of the at least one protein with a first cross-linking agent, in order to form a simple coacervate, followed by the addition of the at least one polysaccharide to form a complex coacervate.

By "coacervate" it is meant polyelectrolyte-rich droplets coexisting with an aqueous, polyelectrolyte poor continuous phase. The droplet agglomerate at interfaces to form an interfacial layer.

In the present context, the coacervate droplets agglomerate at the interface between the core composition and the aqueous phase. As a result, a stable core composition emulsion in water is formed, comprising a plurality of core composition droplets, each droplet being surrounded by coacervate droplets. These stabilize the emulsion in that it prevents the droplets from coalesce.

These stabilized droplets act as templates on which the microencapsulation takes place.

By "simple coacervation" is meant in the present context the formation of an interfacial layer comprising a single polyelectrolyte.

By "complex coacervation" is meant the formation of an interfacial layer comprising a mixture of polyelectrolytes.

The phenomenon of simple or complex coacervation may be observed under a light microscope, wherein it is marked by the appearance of a ring around the core composition droplet. This ring consists of the aforementioned polyelectrolyte-rich phase that has a different refractive index than the surrounding aqueous phase.

The coacervation of a single polyelectrolyte is generally induced by bringing the polyelectrolyte to its isoelectric point, meaning the point where the net charge of the polyelectrolyte is zero or close to zero. This may be achieved by changing the salt concentration or, in the case of a polyampholyte, such as proteins, by changing the pH of the medium.

It has been found that simple coacervation may also be induced by cross-linking a protein at the core composition/water interface.

More specifically, it has been found that building first a simple cross-linked protein coacervate at the core composition/aqueous phase interface, followed by the complex coacervation of this cross-linked protein with a second polyelectrolyte, namely at least one polysaccharide, leads to the formation of a shell having enhanced imperviousness. In particular, the shell shows enhanced imperviousness with respect to low-molecular weight materials, i.e. materials having a molecular weight lower than 250 g/mol, such as fragrance ingredients.

Furthermore, compared to conventional coacervate core-shell microcapsules, capsules obtained by such a process show increased stability in powder formulations.

Moreover, the Applicant has found that by performing the aforementioned process, it is possible to better control the size of the microcapsules, compared to conventional complex coacervation. In particular, it becomes possible to obtain microcapsules in sizes below 75 μm. This is much lower than the microcapsule sizes reported in the prior art. This is also much more advantageous as it is known that microcapsules having size below 75 μm deposit better on substrates during rinse-off applications than larger microcapsules.

Proteins that are particularly suitable for this aspect of the present invention include gelatins, whey proteins, pea proteins, soy proteins, caseins and albumins, for instance bovine serum albumin.

In preferred embodiments the at least one protein is a gelatin, preferably a Type B gelatin. Type B gelatin can be obtained from the alkaline treatment of collagen and is well known for its ability to form complexes with anionic polyelectrolytes, such as negatively charged polysaccharides under mild acidic conditions.

Gelatin is usually characterized by so-called "Bloom Strength". In the present context, the Bloom Strength refers to the rigidity of a gelatin film, as measured by so-called "Bloom Gelometer", according to the Official Procedures of the Gelatin Manufacturers Institute of America, Inc., revised 2019, Chapter 2.1. According to this procedure, the Bloom Strength, expressed in Bloom, is equal to the weight, expressed in g, required to move vertically a standardized plunger, having a diameter of 12.5 mm, to a depth of 4 mm into a gelatin gel, which has been prepared under controlled conditions, i.e. by dissolving 6.67 wt.-% of gelatin in deionized water at 60° C., in a standardized jar, and letting the gel form for 17 hours at 10° C. The higher the weight is, the higher is the Bloom Strength of the gelatin used for making the tested gel.

In preferred embodiments the Type B gelatin has a Bloom Strength of 200 to 250 Bloom. If the Bloom Strength is too low, the gel is mechanically weak and coacervates obtained therefrom may not form a self-standing layer of gelatin-rich phase around the core composition. If the Bloom Strength is too high, then the coacervates and the gelatin-rich phase obtained therefrom may be too brittle.

The Type B gelatin can be obtainable from fish, because fish gelatin meets better acceptance within consumer than beef or pork gelatin, mainly due to health concerns, sociological context or religious rules.

Alternatively, the protein may be a vegetable protein, in particular a pea protein and/or a soy protein, which have the advantage of being vegan.

In preferred embodiments, the first cross-linking agent is a trifunctional alkylaromatic isocyanate. As mentioned before, and without being bound by any theory, the applicant believes that alkylaromatic isocyanate groups have the advantage of possessing an intermediate reactivity compared to the highly reactive aromatic isocyanates and the less reactive aliphatic isocyanate.

More preferably, the trifunctional alkylaromatic isocyanate is an adduct of 2-ethylpropane-1,2,3-triol or 2-ethyl-2-(hydroxymethyl)propane-1,3-diol with 1-isocyanato-2-(isocyanatomethyl)benzene, 1-isocyanato-3-(isocyanatomethyl) benzene and/or 1-isocyanato-4-(isocyanatomethyl)-benzene.

In a particularly preferred embodiment, the trifunctional araliphatic isocyanate is an adduct of 2-ethylpropane-1,2,3-triol with 1-isocyanato-3-(isocyanatomethyl)benzene. Adducts of 2-ethylpropane-1,2,3-triol with 1-isocyanato-3-(isocyanatomethyl)benzene are available commercially under the trade names Takenate D110-N (ex Mitsui Chemicals) or Quix 175 (ex Covestro).

In connection with this aspect of the present invention, the at least one polysaccharide preferably comprises carboxylic acid groups. Polysaccharides comprising carboxylic acid groups are particularly suitable for complex coacervation with proteins, in particular with Type B gelatin. This is due to the fact that the net electrical charge of these polysaccharides may be adjusted by adjusting the pH, so that the complexation with ampholytic proteins is facilitated. Complexation occurs at the pH where the protein has an overall positive electrical charge, whereas the polysaccharide as an overall negative charge, so that the overall electrical charge of the complex is neutral. These polysaccharides include native polysaccharides from nature and modified polysaccharides. Monovalent alkaline metal salts of these polysaccharides may also be used.

In particular, the at least one polysaccharide is selected from the group consisting of carboxymethylcellulose, gum Arabic, alginate, pectin, hyaluronic acid, xanthan gum, gellan gum, and their salts with monovalent alkaline metals. Carboxymethylcellulose, sodium carboxymethylcellulose and gum Arabic are particularly preferred.

In preferred embodiments, the imperviousness and stability of the core-shell microcapsule shell may be further improved by cross-linking of the complex coacervate with a second cross-linking agent. In particularly preferred embodiments, the second cross-linking agent is a difunctional aldehyde selected from the group consisting of succinaldehyde, glutaraldehyde, glyoxal, benzene-1,2-dialdehyde, benzene-1,3-dialdehyde, benzene-1,4-dialdehyde, piperazine-N,N-dialdehyde, and 2,2'-bipyridyl-5,5'-dialdehyde. Di-functional aldehydes are known to be effective cross-linking agents for proteins.

With regard to this aspect of the present invention, the weight ratio of the first cross-linking agent, in particular the trifunctional araliphatic isocyanate, to the at least one protein, in particular the gelatin, can be from 0.08 to 1.2, preferably from 0.12 to 0.8, more preferably from 0.16 to 0.6, even more preferably from 0.2 to 0.4. With such weight ratios of first cross-linking agent to protein, good stability of the microcapsules, in particular with respect to leakage, can be achieved while at the same time ensuring biodegradability.

The weight ratio of polysaccharide to protein typically depends on the nature of the polysaccharide. Without being bound by any theory, it is assumed that this weight ratio depends on the degree of substitution of the polysaccharide, in particular with carboxylic or carboxylate groups, if applicable. Preferably, the weight ratio between the at least one polysaccharide and the at least one protein is from 0.05 to 0.5, preferably from 0.08 to 0.2.

In preferred embodiments of the present invention, the volume median diameter Dv(50) of a plurality of core-shell microcapsules is from 1 to 100 μm, preferably 5 to 75 μm, more preferably 8 to 60 μm, even more preferably 10 to 30 μm. Microcapsules having volume median diameter in the range from 10 to 30 μm show optimal deposition on various substrates, such as fabrics and hair.

If desired, the core-shell microcapsules may be coated with a functional coating. A functional coating may entirely or only partially coat the microcapsule shell. Whether the functional coating is charged or uncharged, its primary purpose is to alter the surface properties of the microcapsule to achieve a desirable effect, such as to enhance the deposition of the microcapsule on a treated surface, such as a fabric, human skin or hair. Functional coatings may be post-coated to already formed core-shell microcapsules, or they may be physically incorporated into the microcapsule shell during shell formation. They may be attached to the shell by physical forces, physical interactions, such as hydrogen bonding, ionic interactions, hydrophobic interactions, electron transfer interactions, or they may be covalently bonded to the shell.

In an encapsulated composition according to the present invention, the proportion of the perfume composition can be 10 to 50 wt.-%, preferably 20 to 47.5 wt.-%, even more preferably 30 to 45 wt.-%, relative to the total weight of the encapsulated composition. Concomitantly, the proportion of the water-soluble matrix can be 30 to 90 wt.-%, preferably 35 to 80 wt.-%, even more preferably 40 to 70 wt.-%, relative to the total weight of the encapsulated composition. Under such conditions, an optimal balance between encapsulation efficiency, storage stability and olfactive performance.

In cases where the water-soluble matrix comprises a hemicellulose, the proportion of the hemicellulose can be 0.02 to 20 wt.-%, preferably 0.1 to 10 wt.-%, even more preferably 0.5 to 5 wt.-%, relative to the total weight of the encapsulated composition.

In cases where the perfume composition is at least partially encapsulated in core-shell microcapsules, the proportion of the perfume composition, which is encapsulated in the core-shell microcapsules, can be 5 to 30 wt.-%, preferably 7 to 25 wt.-%, even more preferably 10 to 20 wt.-%, relative to the total weight of the encapsulated composition.

In preferred embodiments of the present invention, the encapsulated composition is in particulate form. A further aspect of the present invention thus refers to a powder formulation comprising such an encapsulated composition in particulate form.

Such a powder formulation can additionally comprise a solid carrier. The solid carrier can be selected from the group consisting of urea, sodium chloride, sodium sulphate, sodium acetate, zeolite, sodium carbonate, sodium bicarbonate, clay, talc, calcium carbonate, magnesium sulfate, gypsum, calcium sulfate, magnesium oxide, zinc oxide, titanium dioxide, calcium chloride, potassium chloride, magnesium chloride, zinc chloride, saccharides, polyethylene glycol, polyvinylpyrrolidone, citric acid or any water soluble solid acid, fatty alcohols, fatty acids and mixtures thereof.

Diluting such a powder in a carrier material allows for providing formulations that are compliant with dust explosion regulations, as it is known that the explosion risk increases with the concentration of the perfume ingredients in the powder.

When a solid carrier is used, the proportion of the encapsulated composition can be 0.1 to 50 wt.-%, preferably 1 to 30 wt.-%, even more preferably 3 to 15 wt.-%, relative to the total weight of the powder formulation. The proportion of the solid carrier can be 10 to 99.9 wt.-%, preferably 30 to 97 wt.-%, even more preferably 50 to 95 wt.-%, relative to the total weight of the powder formulation. Under such conditions, the powder may be maintained below critical explosion values, in terms of explosivity class and minimal ignition energy value.

As alternative or in addition a solid carrier, a powder formulation according to the present invention can also comprise a flowing agent. The flowing agent is selected from the group consisting of silicon dioxide, sodium salts, calcium salts and zeolites. Flowing agents limit the risk of powder agglomeration and clogging, and ease the transfer of the encapsulated composition from one vessel to another.

A further aspect of the present invention relates to a process for preparing an encapsulated composition, in particular a composition as described herein above. The process comprises the steps of:

a) Preparing an emulsion or a suspension of a perfume composition in a solution of a matrix material in water;
b) Subjecting the emulsion or the suspension to drying, in particular spray-drying or adsorption onto an absorbent, to obtain an encapsulated composition in which the perfume composition is entrapped in a water-soluble matrix.

The perfume composition comprises, preferably consists of, at least one, preferably at least two, more preferably at least four, even more preferably at least eight, even still more preferably at least sixteen, biodegradable ingredient(s), wherein the biodegradable ingredient(s) is/are present at a total concentration of at least 75 wt.-%, preferably at least 80 wt.-%, more preferably at least 85 wt.-%, even more preferably at least 90 wt.-%, even still more preferably at least 95 wt.-%, relative to the total weight of the perfume composition.

A further aspect of the present invention relates to an encapsulated composition obtainable by a process as described herein above.

The present invention also relates to a consumer product comprising an encapsulated composition or a powder formulation as described herein above, preferably a fabric care product, a home care product or a personal care product.

Biodegradation is of particular importance for the aforementioned categories of consumer products, as during and after their intended use, components of these products enter the environment via domestic waste water. Biodegradation is the main process of removal in waste water treatment plants, environmental waters and soils.

The encapsulated compositions of the present invention may be used to perfume consumer products that are anhydrous or in which the water activity is lower than 0.25, preferably lower than 0.1. These products include laundry care powder detergents and solid single dose detergent, such as tablets, laundry care conditioner sheets, fabric refreshers, scent boosters, personal care cleansing compositions, such as soaps, personal care conditioning composition, such as, anhydrous deodorant compositions, antiperspirant compositions, home care compositions, such as powder hard surface cleaners, and heavy duty detergents, such as dish washing tablets.

A consumer product can contain the compositions as described herein above, preferably at a level of 0.005 to 5 wt.-%, more preferably from 0.01 to 1 wt.-%, and still more preferably from 0.02 to 0.5 wt.-%, of the consumer product.

A particular aspect of the present invention relates to a solid scent booster composition comprising an encapsulated composition or a powder formulation as described herein above, and a solid vehicle.

Solid scent boosters are used in laundry applications in order to provide an increased scent to the laundry. They are normally applied during the washing cycle in addition to common liquid or solid detergents, or fabric softeners. Scent booster compositions according to the present invention are particularly attractive, especially with regard to consumer appeal, due to their reduced environmental impact. Encapsulated compositions or powder formulations as described herein above have proven very suitable for the manufacture of solid scent boosters, as they allow for the provision of perfume compositions in dry form and with very low water content, optionally even encapsulated in core-shell microcapsules, if this is required.

The solid scent booster composition can be in form of a plurality of pastilles. Each of the pastilles can have a mass of 0.01 g to 15.0 g, preferably 0.01 g to 5.0 g, more preferably 0.015 g to 2.0 g. Furthermore, each of the pastilles can have a maximum dimension of less than 50 mm, preferably less than 20 mm, more preferably less than 8 mm. Moreover, each of the pastilles can have a shape selected from the group consisting of spherical, hemispherical, compressed hemispherical, lentil shaped and oblong.

The solid scent booster composition can additionally comprise a non-encapsulated perfume composition. The non-encapsulated perfume composition can comprise, preferably consists of, at least one, preferably at least two, more preferably at least four, even more preferably at least eight, even still more preferably at least sixteen, biodegradable ingredient(s). The biodegradable ingredient(s) can be present at a total concentration of at least 75 wt.-%, preferably at least 80 wt.-%, more preferably at least 85 wt.-%, even more preferably at least 90 wt.-%, even still more preferably at least 95 wt.-%, relative to the total weight of the perfume composition. The biodegradable ingredient(s) can be selected from the groups specified herein above. The non-encapsulated perfume composition can be identical or different from the perfume composition used in the encapsulated composition or powder formulation as described herein above.

Additionally or alternatively, the solid scent booster composition can comprise core-shell microcapsules comprising a core and a shell surrounding the core, which do not form part of the encapsulated composition or powder formulation as described herein above. Nevertheless, the core-shell microcapsules are preferably of the kind described herein above.

The solid scent booster composition can additionally comprise a crystallization additive, preferably selected from the group consisting of polyols, starch derivatives and organic acids. In particular the crystallization additive is selected from the group consisting of citric acid, tartaric acid, sorbitol, sucralose, saccharose, maltitol and fructose. A preferred crystallization additive is citric acid. Citric acid is a cost effective bio-based and biodegradable compound capable of influence the kinetic of crystallization of the solid vehicle and thus the solidification of the scent booster composition.

Furthermore, the solid scent booster composition can additionally comprise a dye, especially selected from the group consisting of Carotenoids (E160), Xanthins (E161), Saffron (E164), Chlorophylls (E140), copper complexes of Chlorophylls and/or Chlorophyllins (E141), Anthocyanins (E163), Carmine (E120), Curcumin (E100) and their derivatives, or a visual modifier, especially inorganic and organic pigments like mica powders or titanium dioxide.

In another preferred embodiment, the solid scent booster composition additionally comprises a filler, in particular a filler selected from the group consisting of silica, sodium carbonate, sodium bicarbonate, soluble starch, pre-gelatinized starch, magnesium aluminum silicate, bentonite, microcrystalline cellulose, sodium carboxymethylcellulose, polyvinylpyrrolidone, guar gum, sodium starch glycolate, alginic acid, alginates, ion exchange resin, modified corn starch, sodium dodecyl sulphate, and combinations thereof.

Preferably, in a solid scent booster composition as described herein above, the solid vehicle has a melting temperature of 40° C. to 160° C., more preferably 60° C. to 140° C., even more preferably 80° C. to 120° C., wherein the solid vehicle preferably crystalizes below its melting temperature. Regardless of its melting temperature, the solid vehicle can comprise, preferably consists of, a polyol or a polyether, preferably a sugar alcohol or a polyethylene glycol, in particular a sugar alcohol selected from the group consisting of erythritol, threitol, arabitol, xylitol, ribitol, mannitol, galactitol, fucitol, iditol and inositol, even more preferably xylitol. The polyethylene glycol can have a molecular weight of 2,000 to 12,000 g/mol, preferably 5,000 to 10,000 g/mol.

The proportion of the solid vehicle can be 50 wt.-% to 95 wt.-%, preferably 60 wt.-% to 90 wt.-%, even more preferably 70 wt.-% to 85 wt.-%, relative to the total weight of the solid scent booster composition.

If a crystallization additive is used, the proportion of the same can be 0.1 wt.-% to 5.0 wt.-%, preferably 0.2 wt.-% to 4.0 wt.-%, even more preferably 0.5 wt.-% to 3.0 wt.-%, relative to the total weight of the solid scent booster composition.

The proportion of the encapsulated composition or the powder formulation as described herein above can be 1 wt.-% to 40 wt.-%, preferably 5 wt.-% to 30 wt.-%, even more preferably 10 wt.-% to 20 wt.-%, relative to the total weight of the solid scent booster composition.

If a non-encapsulated perfume composition is used, its proportion can be 1 wt.-% to 40 wt.-%, preferably 5 wt.-% to 30 wt.-%, even more preferably 10 wt.-% to 20 wt.-%, relative to the total weight of the solid scent booster composition.

If microcapsules which do not form part of the encapsulated composition or the powder formulation as described herein above are used, the proportion of the same can be 1.0 wt.-% to 30 wt.-%, preferably 2.0 wt.-% to 20 wt.-%, even more preferably 5.0 wt.-% to 15 wt.-%, relative to the total weight of the solid scent booster composition.

If a dye or visual modifier is used, the proportion of the same can be 0.1 wt.-% to 5.0 wt.-%, preferably 0.2 wt.-% to 4.0 wt.-%, even more preferably 0.5 wt.-% to 2.0 wt.-%, relative to the total weight of the solid scent booster composition.

If a filler is used, the proportion of the same can be 1 wt.-% to 40 wt.-%, preferably 5 wt.-% to 30 wt.-%, even more preferably 10 wt.-% to 20 wt.-%, relative to the total weight of the solid scent booster composition.

A further aspect of the present invention relates to a use of the encapsulated composition as described herein above for obtaining a consumer product.

The present disclosure also relates to a use of an encapsulated composition as described herein above to enhance the performance of a perfume composition in a consumer product, or to a method for enhancing the performance of a perfume composition in a consumer product by adding an encapsulated composition according to the present invention, respectively.

The following is a preferred way for conducting OECD Method 301F.

Principle:

A measured volume of inoculated mineral medium, containing a known concentration of test substance as the nominal sole source of organic carbon, is stirred in a closed flask at a constant temperature. Evolved carbon dioxide is absorbed in sodium hydroxide pellets. The consumption of oxygen is determined by measuring the pressure drop in the respirometer flask. The Biological Oxygen Demand (BOD), amount of oxygen taken up by the microbial population during biodegradation of the test chemical (corrected for uptake by blank inoculum, run in parallel) is expressed as a percentage of ThOD (Theoretical Oxygen Demand, calculated from the elemental composition, assuming that carbon is oxidized to carbon dioxide, hydrogen to water and nitrogen to ammonium, nitrite or nitrate).

Apparatus:

The respirometer used is an Oxitop Control System, made by Wissenschaftlich-Technische Werkstätten (WTW), Weilheim, Germany.

Water:

The water used is ultrapure water, containing less than 5 ppb total organic carbon, produced by using a Millipore Direct-Q 3 UV purification system.

Stock Solutions of Mineral Components:

Solution A:

| | |
|---|---|
| $KH_2PO_4$ | 8.5 g |
| $K_2HPO_4$ | 21.75 g |
| $Na_2HPO_4$•2 $H_2O$ | 33.4 g |
| $NH_4Cl$ | 0.5 g |

dissolved in water and made up to 1 liter.

Solution B:

| | |
|---|---|
| $CaCl_2$ | 27.5 g |

dissolved in water and made up to 1 liter.

Solution C:

| | |
|---|---|
| $MgSO_4$•7 $H_2O$ | 22.5 g |

dissolved in water and made up to 1 liter.

Solution D:

| | |
|---|---|
| $FeCl_3$•6 $H_2O$ | 0.25 g |
| HCl Conc. | one drop |

dissolved in water and made up to 1 liter.

Mineral Medium:

The mineral medium is prepared by mixing 50 ml of solution A and 2 liters deionized water, adding 5 ml of each of the solutions B, C and D and making up to 5 liters with deionized water. The pH is measured and if necessary adjusted to 7.4±0.2 with phosphoric acid or potassium hydroxide.

Inoculum:

Fresh activated sludge from a biological waste water treatment plant treating predominantly domestic sewage (Bois-de-Bay, Satigny, Switzerland) is used.

The sludge is collected in the morning, washed three times in the mineral medium (by centrifuging at 1000 g for 10 minutes, discarding the supernatant and resuspending in mineral medium) and kept aerobic until being used on the same day.

Determination of the Dry Weight of Suspended Solids:

The dry weight of suspended solids is determined by taking two 50 ml samples of the homogenized sludge, evaporating water on a steam bath, drying in an oven at 105 to 110° C. for two hours and weighing the residue.

Reference Substance:

Sodium benzoate (Fluka, Buchs, Switzerland, Art. No. 71300), purity: min. 99.0%.

Preparation of the Flasks:

Test substance samples (corresponding to 30.0 mg/l in 255 ml of test medium) are weighed in small aluminium boats and added directly to the test flasks of the Oxitop. For reference substance samples 12.75 mg (corresponding to 50.0 mg/l in 255 ml of test medium) are weighed in small aluminium boats and added directly to the test flasks of the Oxitop.

Flasks are filled with 250 ml of mineral medium. Samples of test or reference substance are added. Then 5.00 ml of suspended sludge diluted to a concentration of 1.53 g/I dry matter is added. Except when the test substance had an acid or alkaline character, the pH of each flask is not measured but assumed to be the same as the mineral medium, in order not to remove any floating undissolved test substance from the test medium by dipping a glass electrode in it. Neutral test substances, even sodium benzoate, were shown not to affect the pH of the medium by more than 0.1 pH unit. Two sodium hydroxide pellets are placed in the quivers on top of the bottle, and the flasks are closed tightly with the measuring heads. The flasks are allowed to equilibrate to the test temperature. The measurement is started by programming the measuring unit of the Oxitop test flasks, and the test flasks are placed in the temperature controlled cupboard of the Oxitop system. After temperature equilibration, the controller of the instrument started data acquisition (time zero of the experiment).

Test Temperature:

The test temperature is 21.5±0.5° C.

Performance of the Test:

Every day the oxygen consumption of each flask is recorded, and correct temperature and stirring are checked. At the end of the test period (normally 28 days), the pH of each flask is measured again.

The biodegradation for each data point is calculated as follows:

$$D=(C-B)/ThOD\cdot 100\%$$

D: Biodegradation of sample

C: $O_2$ uptake of sample and sludge

B: $O_2$ uptake of sludge (inoculum blank)

ThOD: Theoretical oxygen demand

The pass level for "ready biodegradability" is to reach 60% of theoretical oxygen demand (ThOD). This pass value has to be reached in a 10-day window within the 28-day period of the test. The 10-day window begins when the degree of biodegradation has reached 10% of theoretical oxygen demand (ThOD) and must end before day 28 of the test.

The pass level for "inherently biodegradable" is also 60% of theoretical oxygen demand (ThOD). However, this pass value can be reached after the 28-day period of the test, which is usually extended to 60 days. No 10-day window applies.

Further features and particular advantages of the present invention become apparent from the following examples.

EXAMPLE 1: PERFUME COMPOSITIONS CONSISTING OF BIODEGRADABLE INGREDIENTS

Perfume compositions consisting of biodegradable ingredients can be prepared by mixing such ingredients according to the formulae provided in Table 1.

TABLE 1

| Ingredient | Perfume No. 1 | 2 | 3 | 4 | 5 | 6 | 7 |
|---|---|---|---|---|---|---|---|
| | Amount (wt.-%) | | | | | | |
| 2-(tert-butyl)cyclohexyl acetate | 5.0 | 22.0 | 15.0 | 8.0 | | | |
| undec-10-enal | | | | 0.4 | | | |
| undecanal | 1.0 | | | | | | |
| dodecanal | | | | 1.0 | | | |
| 2-methylundecanal | | | | 2.0 | | | |
| prop-2-enyl 2-(3-methylbutoxy)acetate | | | 5.0 | | | | |
| prop-2-enyl 3-cyclohexylpropanoate | | 7.5 | 4.0 | | | | |
| prop-2-enyl hexanoate | | 6.0 | | | | | |
| prop-2-enyl heptanoate | | | 6.0 | | | | |
| pentyl 2-hydroxybenzoate | | | | 12.0 | | | |
| 4-methoxybenzaldehyde | 2.0 | | 1.0 | | | | |
| benzyl acetate | 3.0 | | 4.0 | | | | |
| benzyl 2-hydroxybenzoate | 8.5 | | | 6.0 | | | |
| (1S,4S)-1,7,7-trimethylbicyclo[2.2.1]heptan-2-one | | | | | | | 2.0 |
| (1S,8aR)-1,4,4,6-tetramethyl-2,3,3a,4,5,8-hexahydro-1H-5,8a-methanoazulene | | | | | 4.0 | | |
| (1S,6R,8aR)-1,4,4,6-tetramethyloctahydro-1H-5,8a-methanoazulen-6-yl acetate | | | | | 2.0 | | |
| (1R,6S,8aS)-6-methoxy-1,4,4,6-tetramethyloctahydro-1H-5,8a-methanoazulene | 1.0 | | | | 2.0 | | |
| (E)-3-phenylprop-2-en-1-ol | | | | 2.0 | | | |
| (2E)-3-phenylprop-2-enal | 0.5 | | | | | | |
| (E)-3,7-dimethylocta-2,6-dienal | 2.0 | | | | | | |
| 3,7-dimethyloct-6-enal | | | | 2.0 | | | |
| 2H-chromen-2-one | | | | 2.0 | | | 2.0 |
| 1-methoxy-4-methylbenzene | 0.5 | | | | | | |
| 3-(4-isopropylphenyl)-2-methylpropanal | | | | | 5.0 | | |
| (E)-1-(2,6,6-trimethylcyclohexa-1,3-dien-1-yl)but-2-en-1-one | | 0.5 | | | | | |
| (E)-1-(2,6,6-trimethylcyclohex-2-en-1-yl)but-2-en-1-one | | 1.0 | 1.0 | | 3.0 | | |
| (E)-dec-4-enal | | | | | 0.1 | | |
| 2,6-dimethyloct-7-en-2-ol | 15.0 | | 3.0 | 4.0 | | | |
| 2-methyl-1-phenylpropan-2-yl acetate | | | | | | 15.0 | |
| 2-methyl-1-phenylpropan-2-yl butanoate | 1.0 | | | | | | |
| 1-methyl-4-(prop-1-en-2-yl)cyclohex-1-ene | 5.0 | | | 3.0 | | 10.0 | |
| oxydibenzene | 1.0 | | 2.0 | | | | |
| ethyl hexanoate | | 3.0 | | | | | |
| ethyl 2-methyl butyrate | | | 2.0 | | | | |
| ethyl heptanoate | | 7.5 | 2.0 | | | | |
| 1,4-dioxacycloheptadecane-5,17-dione | | | | | | 10.0 | |
| (1s,4s)-1,3,3-trimethyl-2-oxabicyclo[2.2.2]octane | 4.0 | | | 1.0 | | | 15.0 |
| 4-allyl-2-methoxyphenol | 2.0 | | | | | | |
| methyl 2,4-dihydroxy-3,6-dimethylbenzoate | | | | | | 1.0 | |
| (2S)-1,3,3-trimethylbicyclo[2.2.1]heptan-2-yl acetate | | | | | | | 2.0 |
| 3-(3-isopropylphenyl)butanal | | | | | 4.0 | | |
| 2-(sec-butyl)cyclohexanone | 1.0 | | | | | | |
| 1-(5,5-dimethylcyclohex-1-en-1-yl)pent-4-en-1-one | | 0.5 | | | | 2.0 | |
| (E)-3,7-dimethylocta-2,6-dien-1-ol | 3.5 | | | | | | |
| methyl 3-oxo-2-pentylcyclopentaneacetate | | | | | 6.0 | | 8.0 |
| (E)-hex-2-enal | | 0.5 | | | | | |
| (Z)-hex-3-en-1-ol | | 1.0 | | | | | |
| (Z)-hex-3-en-1-yl acetate | | | 1.0 | | | | |
| (Z)-hex-3-en-1-yl butanoate | | 2.0 | | | | | |
| hexyl acetate | | 15.0 | 7.0 | | | | |
| (E)-2-benzylideneoctanal | 2.0 | | | 9.0 | | | |
| hexyl 2-methylpropanoate | | 3.0 | | | | | |
| (E)-4-(2,6,6-trimethylcyclohex-1-en-1-yl)but-3-en-2-one | | 3.0 | 8.0 | | 12.0 | | |
| (E)-4-(2,6,6-trimethylcyclohex-2-en-1-yl)but-3-en-2-one | | | | | 1.4 | | |
| 3-methylbutyl acetate | | 2.5 | 1.0 | | 4.0 | | |
| [(1R,4S,6R)-1,7,7-trimethyl-6-bicyclo[2.2.1]heptanyl] acetate | | | | 3.0 | | 12.0 | |
| (E)-2-methoxy-4-(prop-1-en-1-yl)phenol | | | | 0.5 | | | |
| (E)-3-methyl-4-(2,6,6-trimethylcyclohex-2-en-1-yl)but-3-en-2-one | | 2.0 | | | 5.0 | | |
| (2E,6Z)-3,7-dimethylnona-2,6-dienenitrile | | | | | | 1.0 | |
| (Z)-hex-3-en-1-yl methyl carbonate | | 1.5 | | | | | |
| 3,7-dimethylocta-1,6-dien-3-ol | 18.0 | | | 14.0 | | | 15.0 |

TABLE 1-continued

| Ingredient | Perfume No. 1 | 2 | 3 | 4 | 5 | 6 | 7 |
|---|---|---|---|---|---|---|---|
| | Amount (wt.-%) | | | | | | |
| 3,7-dimethylocta-1,6-dien-3-yl acetate | 0.5 | | | 2.0 | | 5.0 | 15.0 |
| (3R,3aR,8R,8aS)-4,4,8-trimethyl-9-methylenedecahydro-3,8-methanoazulene | 2.0 | | | | | | |
| ethyl 2-methylpentanoate | | 5.0 | 5.0 | 0.3 | | | |
| (4-isopropylcyclohexyl)methanol | | | | | | 2.0 | |
| methyl 2-aminobenzoate | 1.0 | | | | | | |
| methyl non-2-ynoate | | 0.5 | | | | | |
| 2-(2-(4-methylcyclohex-3-en-1-yl)propyl)cyclopentanone | | 3.5 | 1.0 | 1.0 | | | |
| 2-ethoxynaphthalene | | | | | | 5.0 | |
| 1-(3-methylbenzofuran-2-yl)ethanone | | | | | | 1.0 | |
| 3-(4-(2-methylpropyl)-2-methylphenyl)propanal | 1.0 | | | 2.0 | | 15.0 | |
| 1-(2-naphtalenyl)-ethanone | | | | 1.0 | | 1.0 | |
| 4-(tert-butyl)cyclohexyl acetate | 12.5 | | | | 25.0 | | |
| 5-heptyldihydrofuran-2(3H)-one | | 6.5 | | 3.0 | | | |
| 2-cyclohexylhepta-1,6-dien-3-one | | 0.5 | | | | | |
| 2-phenylethyl acetate | | | | 1.0 | | | |
| 2-phenylethanol | | | | 4.0 | | | |
| 5-pentyldihydrofuran-2(3H)-one | | | 1.0 | | | 2.0 | |
| 4-(4-hydroxyphenyl)butan-2-one | | | 2.0 | | | | |
| dec-9-en-1-ol | | | | | 0.5 | | |
| 4-methyl-2-(2-methylprop-1-en-1-yl)tetrahydro-2H-pyran | | | | 0.2 | | | |
| 4-methyl-2-phenyl-3,6-dihydro-2H-pyran | | | | 0.1 | | | |
| 4-(dodecylthio)-4-methylpentan-2-one | | 0.5 | | | | | |
| 1-phenylethyl acetate | | | 2.0 | 2.0 | | | |
| (E)-2-((3,5-dimethylhex-3-en-2-yl)oxy)-2-methylpropyl cyclopropanecarboxylate | | | | 2.5 | | | |
| 1-methyl-4-propan-2-ylcyclohexa-1,4-diene | | | | | | 2.0 | |
| 2-(4-methylcyclohex-3-en-1-yl)propan-2-ol | | | | 9.0 | | 1.0 | |
| 1-methyl-4-(propan-2-ylidene)cyclohex-1-ene | 3.0 | | | | | 5.0 | |
| 2-(4-methyl-1-cyclohex-3-enyl)propan-2-yl acetate | 4.0 | | | | | 10.0 | |
| 3,7-dimethyloctan-3-ol | | | 15.0 | | 26.0 | | 40.0 |
| 1-(cyclopropylmethyl)-4-methoxybenzene | | | 1.0 | | | | |
| 3-phenylbutanal | | 2.0 | 2.0 | | | | |
| (E)-4-methyldec-3-en-5-ol | | 3.0 | 7.5 | | | | |
| 2-methoxynaphtalene | | | 1.5 | 2.0 | | | 1.0 |
| Total | 100.0 | 100.0 | 100.0 | 100.0 | 100.0 | 100.0 | 100.0 |

EXAMPLE 2: DEGRADATION TESTS OF PERFUME COMPOSITIONS

Perfume compositions according to Table 1 can be submitted to biodegradation testing as described herein above. Since all ingredients used in these perfume compositions are biodegradable ingredients, the perfume compositions will be found to be particularly beneficial in terms of biodegradation.

EXAMPLE 3: PREPARATION OF ENCAPSULATED COMPOSITION

An encapsulated composition according to the present invention can be prepared as follows:

Tap water (50.0 g) is weighted into a stainless steel beaker. Starch sodium octenyl succinate E1450 (20.0 g), starch modified Hi-Cap 100 (3.0 g) and maltodextrin Glucidex IT-19 (6.0 g) are subsequently weighted into the same beaker. The resulting mixture is first manually stirred with a stainless steel rod and then homogenized with an IKA T25 Ultra-Turrax Homogenizer at 13,500 rpm to obtain a homogeneous solution. To this resulting mixture, perfume oil (Table 1; 20.0 g) is added. High shear mixing is then carried out for 20-30 min at 22,000-24,000 rpm using the same Homogenizer to produce an emulsion. The droplet size is controlled by dynamic light scattering to be between 0.5 and 2 μm.

The emulsion is subjected to spray drying using a Lab-Plant SD-06 Spray Dryer. The spray drying process parameters are as follows:

Inlet Temperature: 190° C.

Outlet Temperature: 90° C.

Peristaltic pump speed: 485 mL/h

Air flow rate: 3.7 m/s

The resulting spray dried powder is mixed with silicon dioxide Aerosil 200 (1.0 g) in a closed mixing vessel.

EXAMPLE 4: PREPARATION OF ENCAPSULATED COMPOSITION

An alternative example of an encapsulated composition according to the present invention can be prepared as follows:

Tap water (55.0 g) is weighted into a stainless steel beaker. Starch sodium octenyl succinate E1450 (18.7 g), starch modified Hi-Cap 100 (2.2 g), maltodextrin Glucidex IT-19 (5.3 g) and tamarind kernel powder (0.5 g) are subsequently weighted into the same beaker. The resulting mixture is first manually stirred with a stainless steel rod and then homogenized with an IKA T25 Ultra-Turrax Homogenizer at 13,500 rpm to obtain a homogeneous solution. To this resulting mixture, perfume oil (Table 1; 17.8 g) is added. High shear mixing is then carried out for 20-30 min at 22,000-24,000 rpm using the same Homogenizer to produce an emulsion. The droplet size is controlled by dynamic light scattering to be between 0.5 and 2 µm.

The emulsion is subjected to spray drying using a LabPlant SD-06 Spray Dryer. The spray drying process parameters are as follows:

Inlet Temperature: 190° C.

Outlet Temperature: 90° C.

Peristaltic pump speed: 485 mL/h

Air flow rate: 3.7 m/s

The resulting spray dried powder is mixed with silicon dioxide Aerosil 200 (0.5 g) in a closed mixing vessel.

EXAMPLE 5: PREPARATION OF ENCAPSULATED COMPOSITION

Yet another alternative example of an encapsulated composition according to the present invention can be prepared as follows:

Tap water (45.0 g) is weighted into a stainless steel beaker. Starch sodium octenyl succinate E1450 (21.9 g), mannitol 60 (5.5 g) and tamarind kernel powder (0.5 g) are subsequently weighted into the same beaker. The resulting mixture is first manually stirred with a stainless steel rod and then homogenized with an IKA T25 Ultra-Turrax Homogenizer at 13,500 rpm to obtain a homogeneous solution. To the resulting mixture, perfume oil (Table 1; 27.3 g) is added. High shear mixing is then carried out for 20-30 min at 22,000-24,000 rpm using the same Homogenizer to produce an emulsion.

The droplet size is controlled by dynamic light scattering to be between 0.5 and 2 µm.

The emulsion is subjected to spray drying using a LabPlant SD-06 Spray Dryer. The spray drying process parameters are as follows:

Inlet Temperature: 190° C.

Outlet Temperature: 90° C.

Peristaltic pump speed: 485 mL/h

Air flow rate: 3.7 m/s

The resulting spray dried powder is mixed with silicon dioxide Aerosil 200 (0.5 g) in a closed mixing vessel.

EXAMPLE 6: PREPARATION OF ENCAPSULATED COMPOSITION

A further example of an encapsulated composition according to the present invention can be prepared as follows:

Tap water (55.0 g) is weighted into a stainless steel beaker. Starch sodium octenyl succinate E1450 (12.3 g), and mannitol 60 (3.1 g) are subsequently weighted into the same beaker. The resulting mixture is first manually stirred with a stainless steel rod and then homogenized with an IKA T25 Ultra-Turrax Homogenizer at 13,500 rpm to obtain a homogeneous solution. To this resulting mixture, perfume oil (Table 1; 15.3 g) is added. High shear mixing is then carried out for 20-30 min at 22,000-24,000 rpm using the same Homogenizer to produce an emulsion. The droplet size is controlled by dynamic light scattering to be between 0.5 and 2 µm.

To the emulsion is added a slurry of core-shell microcapsules (Examples 7-12; 14.0 g; containing 5.1 g of encapsulated fragrance) and agitated at 300 rpm for 10 min.

The resulting mixture is subjected to spray drying using a LabPlant SD-06 Spray Dryer. The spray drying process parameters are as follows:

Inlet Temperature: 180° C.

Outlet Temperature: 80° C.

Peristaltic pump speed: 485 mL/h

Air flow rate: 3.7 m/s

The resulting spray dried powder is mixed with silicon dioxide Aerosil 200 (0.3 g) and sodium sulfate (90 g) in a closed mixing vessel.

EXAMPLE 7: PREPARATION OF MELAMINE-FORMALDEHYDE MICROCAPSULES

Melamine-formaldehyde core-shell microcapsules for use in the present invention can be prepared by performing the following procedures with a perfume composition as described herein above (Table 1):

Example 1.3 of WO 2008/098387 A1

Example 1 of WO 2016/207180 A1

Example 1 of WO 2017/001672 A1

EXAMPLE 8: PREPARATION OF POLYUREA MICROCAPSULES

Polyurea core-shell microcapsules for use in the present invention can be prepared by performing the following procedure with a perfume composition as described herein above (Table 1):

Example 1 of WO 2019/174978 A1

EXAMPLE 9: PREPARATION OF CELLULOSE MICROCAPSULES

Core-shell microcapsules for use in the present invention can be prepared by performing the steps of:

a) Preparing a core composition by admixing 0.66 g of bipodal aminosilane (bis(3-triethoxysilylpropyl) amine), 0.48 g of Takenate D-110N (ex Mitsui) and 38.5 g of perfume composition as described herein above (Table 1);
b) Emulsifying the core composition obtained in step a) in a mixture of 1.35 g high methoxylated grade pectin (of type APA 104, ex Roeper) in 66.2 g of water by using a 300 ml reactor and a cross-beam stirrer with pitched beam operating at a stirring speed of 800 rpm at a temperature of 25+/−2° C. for 10 min;
c) Adjusting the pH of the continuous phase of the emulsion to 6.5+/−0.5 with a 10% sodium hydroxide solution in water and maintaining the system at a temperature of 25+/−2° C. for 1 h while maintaining stirring as in step b);
d) Increasing progressively the temperature to 85° C. over 2.5 h and maintaining the temperature at 85° C. for 1 h, while maintaining stirring as in steps b) and c) to complete the formation of core-shell capsules;
e) Adding 1.8 g of 2-hydroxyethyl cellulose and continue stirring for 30 min at 85° C.;
f) Adding 0.8 g of a solution of citric acid diluted at 30% in water and continue stirring for 1 h at 85° C.;
g) Letting the slurry of core-shell capsules obtained in step f) cool to room temperature.

EXAMPLE 10: PREPARATION OF GELATIN COACERVATE MICROCAPSULES

Gelatin coacervate core-shell microcapsules for use in the present invention can be prepared by performing the following procedures with a perfume composition as described herein above (Table 1):

Example 1 of WO 1996/020612 A1

Example 2 of WO 2001/03825 A1

One of Examples 1-3 of WO 2015/150370 A1

EXAMPLE 11: PREPARATION OF GELATIN COACERVATE MICROCAPSULES

Core-shell microcapsules for use in the present invention can be prepared by performing the steps of:

a) Providing a core composition by dissolving 70 g of a trifunctional araliphatic isocyanate (Takenate N100-D, ex Mitsui Inc., 75 wt.-% active content) in 165 g of a perfume composition as described herein above (Table 1);
b) Providing an aqueous phase by admixing 17 g of Type B gelatin and 150 g of deionized water;
c) Heating up the aqueous phase to 35° C. under stirring, in order to dissolve the gelatin;
d) Emulsifying the core composition in the aqueous phase obtained in step c) at a stirring rate of 1000 rpm, in order to obtain an emulsion of core composition droplets having a volume average diameter Dv(50) of 50 μm, dispersed in water;
e) Heating the emulsion obtained in step d) to a temperature of 90° C. and maintaining the emulsion at this temperature for 10 min;
f) Letting the slurry obtained in step e) cool down to a temperature of 31° C., in order to induce the simple coacervation of the cross-linked gelatin at the core-water-interface, forming thereby a slurry of core-shell microcapsules;
g) Adding 80 g of a 2 wt.-% aqueous solution of carboxymethylcellulose in deionized water and then 534 g of deionized water to the slurry formed in step f), while maintaining the stirring rate at 1000 rpm;
h) Adjusting the pH of the slurry to a value of 5.3 with a 10 wt.-% solution of citric acid in water; while reducing the stirring speed to 600 rpm, in order to form a cross-linked gelatin/polysaccharide coacervate at the surface of the microcapsules obtained in step f);
i) Letting the slurry obtained in step h) cool down to a temperature of 10 to 15° C. over 1 h;
j) Adding 0.26 g of glutaraldehyde while keeping the slurry under stirring at 15° C. for 1 min. Letting the slurry warm up to room temperature within 1 h, in order to obtain a slurry of microcapsules;
k) Completing to 1000 g with deionized water.

EXAMPLE 12: PREPARATION OF POLYACRYLATE-BASED MICROCAPSULES

Polyacrylate-based core-shell microcapsules for use in the present invention can be prepared by performing the following procedure with a perfume composition as described herein above (Table 1):

Example 1 of WO 2013/111912 A1

Example 1 of WO 2014/032920 A1

EXAMPLE 13: PREPARATION OF SOLID SCENT BOOSTER COMPOSITION

A solid scent booster composition can be prepared by performing the following steps:

a) Xylitol powder (77 g) is combined with citric acid solution (55% in water; 3 g) inside a 150 ml beaker;
b) The temperature of the resulting mixture is increased to 120° C. and maintained until the mixture is completely molten;
c) The hot melt is stirred at 50 RPM during 5 min. The temperature is then decreased to 95° C.;
d) A slurry of core-shell microcapsules (Examples 7-12; 9 g; containing 3.6 g of encapsulated fragrance) is added and stirring is maintained until capsules are homogeneously dispersed;
e) Mixing is increased to 500 RPM and an encapsulated perfume composition according to one of Examples 3 to 5 (11 g) is dispersed in the hot melt;
f) The mixture is pumped and distributed as hemispheric droplets on a silicone substrate;
g) The hemispheric droplets are let to crystallize at room temperature;
h) Solid scent boosters pastilles containing both encapsulated fragrance and free oil are obtained.

EXAMPLE 14: PREPARATION OF SOLID SCENT BOOSTER COMPOSITION

A solid scent booster composition can be prepared by performing the following steps:

a) Xylitol powder (81 g) is combined with citric acid solution (55% in water; 3 g) inside a 150 ml beaker;
b) The temperature of the resulting mixture is increased to 120° C. and maintained until the mixture is completely molten;
c) The hot melt is stirred at 50 RPM during 5 min. The temperature is then decreased to 95° C.;
d) Mixing is increased to 500 RPM and an encapsulated perfume composition according to Example 6 (16 g) is dispersed in the hot melt;
e) The mixture is pumped and distributed as hemispheric droplets on a silicone substrate;
f) The hemispheric droplets are let to crystallize at room temperature;
g) Solid scent boosters pastilles containing both encapsulated fragrance and free oil are obtained.

EXAMPLE 15: PREPARATION OF SOLID SCENT BOOSTER COMPOSITION

A solid scent booster composition can be prepared by performing the following steps:

a) Xylitol powder (79 g) is combined with citric acid solution (55% in water; 3 g) inside a 150 ml beaker;
b) The temperature of the resulting mixture is increased to 120° C. and maintained until the mixture is completely molten;
c) The hot melt is stirred at 50 RPM during 5 min. The temperature is then decreased to 95° C.;
d) Spray-dried core-shell microcapsules (Examples 7-12; 7 g; containing 3.5 g of encapsulated fragrance) are added and stirring is maintained until capsules are homogeneously dispersed;
e) Mixing is increased to 500 RPM and an encapsulated perfume composition according to one of Examples 3 to 5 (11 g) is dispersed in the hot melt;
f) The mixture is pumped and distributed as hemispheric droplets on a silicone substrate;
g) The hemispheric droplets are let to crystallize at room temperature;

h) Solid scent boosters pastilles containing both encapsulated fragrance and free oil are obtained.

The invention claimed is:

1. An encapsulated composition comprising a perfume composition that is entrapped in a water-soluble matrix, wherein the perfume composition comprises, at least one biodegradable ingredient(s), wherein the biodegradable ingredient(s) is/are present at a total concentration of at least 75 wt.-%, relative to the total weight of the perfume composition, and wherein the biodegradable ingredient(s) are selected from, and is/are present at a concentration equal to or less than the indicated maximum concentration as indicated in the following group consisting of:

1-phenylethanone: 0.5 wt.-%
2,6,10-trimethylundec-9-enal: 1 wt.-%
2-(tert-butyl)cyclohexyl acetate: 50 wt.-%
hexan-1-ol: 10 wt.-%
decanal: 10 wt.-%
2-methyldecanal: 0.5 wt.-%
undec-10-enal: 2 wt.-%
undecanal: 5 wt.-%
dodecanal: 10 wt.-%
2-methylundecanal: 50 wt.-%
hexanal: 5 wt.-%
octanal: 5 wt.-%
3,5,5-trimethylhexanal: 0.5 wt.-%
nonanal: 5 wt.-%
(E)-undec-9-enal: 5 wt.-%
prop-2-enyl 2-(3-methylbutoxy)acetate: 5 wt.-%
prop-2-enyl hexanoate: 5 wt.-%
prop-2-enyl 3-cyclohexylpropanoate: 10 wt.-%
prop-2-enyl heptanoate: 10 wt.-%
3,8,8,11a-tetramethyldodecahydro-1H-3,5a-epoxynaphtho[2,1-c]oxepine: 2 wt.-%
(Z)-oxacycloheptadec-10-en-2-one: 2 wt.-%
(3aR,5aS,9aS,9bR)-3a,6,6,9a-tetramethyl-2,4,5,5a,7,8,9,9b-octahydro-1H-benzo[e][1]benzofuran: 2 wt.-%
pentyl butanoate: 2 wt.-%
(Z)-2-benzylideneheptanal: 5 wt.-%
pentyl 2-hydroxybenzoate: 50 wt.-%
(E)-1-methoxy-4-(prop-1-en-1-yl)benzene: 2 wt.-%
4-methoxybenzyl acetate: 15 wt.-%
1-(3,3-dimethylcyclohexyl)ethyl formate: 0.5 wt.-%
4-methoxybenzaldehyde: 5 wt.-%
(E)-methyl 2-((7-hydroxy-3,7-dimethyloctylidene)amino)benzoate: 0.2 wt.-%
benzaldehyde: 1 wt.-%
benzyl acetate: 10 wt.-%
4-phenylbutan-2-one: 10 wt.-%
phenylmethanol: 10 wt.-%
benzyl benzoate: 85 wt.-%
benzyl 3-phenylprop-2-enoate: 2 wt.-%
benzyl 2-hydroxybenzoate: 75 wt.-%
octahydro-2H-chromen-2-one: 2 wt.-%
(1S,2S,4S)-1,7,7-trimethylbicyclo[2.2.1]heptan-2-ol: 10 wt.-%
(2S,4S)-1,7,7-trimethylbicyclo[2.2.1]heptan-2-yl acetate: 35 wt.-%
3-(4-(tert-butyl)phenyl) propanal: 2 wt.-%
butyl acetate: 2 wt.-%
4-(tert-butyl)cyclohexyl acetate: 50 wt.-%
(1S,4S)-1,7,7-trimethylbicyclo[2.2.1]heptan-2-one: 25 wt.-%
(5R)-2-methyl-5-prop-1-en-2-ylcyclohex-2-en-1-one: 25 wt.-%
(1R,6S,8aS)-6-methoxy-1,4,4,6-tetramethyloctahydro-1H-5,8a-methanoazulene: 5 wt.-%
(E)-1-(2,6,6-trimethylcyclohex-2-en-1-yl) hepta-1,6-dien-3-one: 0.5 wt.-%
(E)-3-phenylprop-2-en-1-ol: 10 wt.-%
(2E)-3-phenylprop-2-enal: 35 wt.-%
(E)-3-phenylprop-2-en-1-yl acetate: 0.5 wt.-%
(Z)-hex-3-en-1-ol: 25 wt.-%
(Z)-3-methyl-2-(pent-2-en-1-yl)cyclopent-2-enone: 2 wt.-%
(E)-3,7-dimethylocta-2,6-dienal: 5 wt.-%
3,7-dimethyloct-6-enal: 1 wt.-%
3,7-dimethyloct-6-en-1-ol: 25 wt.-%
3,7-dimethyloct-6-en-1-yl acetate: 25 wt.-%
3,7-dimethyloct-6-en-1-yl formate: 1 wt.-%
3,7-dimethyloct-6-enenitrile: 10 wt.-%
dodecanenitrile: 10 wt.-%
4-cyclohexyl-2-methylbutan-2-ol: 5 wt.-%
2-hydroxy-3-methylcyclopent-2-enone: 5 wt.-%
(Z)-3-methylcyclotetradec-5-enone: 5 wt.-%
2H-chromen-2-one: 5 wt.-%
1-methoxy-4-methylbenzene: 1 wt.-%
4-isopropylbenzonitrile: 0.5 wt.-%
3-(4-isopropylphenyl)-2-methylpropanal: 5 wt.-%
(E)-1-(2,6,6-trimethylcyclohexa-1,3-dien-1-yl) but-2-en-1-one: 2.5 wt.-%
(E)-1-(2,6,6-trimethylcyclohex-2-en-1-yl) but-2-en-1-one: 5 wt.-%
5-hexyloxolan-2-one: 15 wt.-%
(E)-dec-4-enal: 1 wt.-%
1-methoxy-4-propylbenzene: 2 wt.-%
2,6-dimethyloct-7-en-2-ol: 50 wt.-%
2-methyl-1-phenylpropan-2-yl acetate: 75 wt.-%
2-methyl-1-phenylpropan-2-yl butanoate: 50 wt.-%
2,6-dimethylheptan-2-ol: 5 wt.-%
oxydibenzene: 15 wt.-%
(E)-dodec-2-enal: 0.1 wt.-%
(E)-3-methyl-5-(2,2,3-trimethylcyclopent-3-en-1-yl)pent-4-en-2-ol: 5 wt.-%
ethyl cyclohexyl carboxylate: 0.5 wt.-%
ethyl acetate: 10 wt.-%
ethyl 3-oxobutanoate: 2 wt.-%
ethyl 3-phenylprop-2-enoate: 2 wt.-%
ethyl hexanoate: 10 wt.-%
(E)-3,7-dimethylnona-1,6-dien-3-ol: 35 wt.-%
2-ethyl-3-hydroxy-4H-pyran-4-one: 10 wt.-%
ethyl 2-methylbutanoate: 15 wt.-%
ethyl heptanoate: 5 wt.-%
3-ethoxy-4-hydroxybenzaldehyde: 10 wt.-%
1,4-dioxacycloheptadecane-5,17-dione: 25 wt.-%
(1s,4s)-1,3,3-trimethyl-2-oxabicyclo[2.2.2]octane: 25 wt.-%
4-allyl-2-methoxyphenol: 5 wt.-%
methyl 2,4-dihydroxy-3,6-dimethylbenzoate: 2 wt.-%
(1S,2R,4R)-1,3,3-trimethylbicyclo[2.2.1]heptan-2-ol: 2 wt.-%
3-(4-methoxyphenyl)-2-methylpropanal: 2 wt.-%
3-(3-isopropylphenyl) butanal: 5 wt.-%
tetrahydro-4-methyl-2-(2-methylpropyl)-2H-pyran-4-ol: 10 wt.-%
2-(sec-butyl)cyclohexanone: 10 wt.-%
2-methyldecanenitrile: 1 wt.-%
1-(5,5-dimethylcyclohex-1-en-1-yl) pent-4-en-1-one: 5 wt.-%
(E)-3,7-dimethylocta-2,6-dien-1-ol: 25 wt.-%
(E)-3,7-dimethylocta-2,6-dien-1-yl acetate: 10 wt.-%
(E)-6,10-dimethylundeca-5,9-dien-2-one: 1 wt.-%
(E)-oxacyclohexadec-12-en-2-one: 15 wt.-%
methyl 3-oxo-2-pentylcyclopentaneacetate: 75 wt.-% benzo[d][1,3]dioxole-5-carbaldehyde: 10 wt.-%
(E)-hex-2-enal: 1 wt.-%
(Z)-hex-3-en-1-ol: 15 wt.-%
(Z)-hex-3-en-1-yl acetate: 15 wt.-%
(Z)-hex-3-en-1-yl 2-methylpropanoate: 1 wt.-%
(Z)-hex-3-en-1-yl 2-hydroxybenzoate: 15 wt.-%
hexyl acetate: 15 wt.-%
(E)-2-benzylideneoctanal: 25 wt.-%
hexyl 2-methylpropanoate: 5 wt.-%
hexyl 2-hydroxybenzoate: 85 wt.-%
7-hydroxy-3,7-dimethyloctanal: 1 wt.-%
1H-indole: 0.5 wt.-%
(E)-4-(2,6,6-trimethylcyclohex-1-en-1-yl) but-3-en-2-one: 25 wt.-%
(E)-4-(2,6,6-trimethylcyclohex-2-en-1-yl) but-3-en-2-one: 25 wt.-%
3-methylbutyl acetate: 5 wt.-%
(E)-2-methoxy-4-(prop-1-en-1-yl) phenol: 1 wt.-%
2-isopropyl-5-methylcyclohexanone: 1 wt.-%
isopropyl 2-methylbutanoate: 5 wt.-%
(E)-3-methyl-4-(2,6,6-trimethylcyclohex-2-en-1-yl) but-3-en-2-one: 50 wt.-%
(Z)-3-methyl-2-(pent-2-en-1-yl)cyclopent-2-enone: 0.5 wt.-%
3-butyl-5-methyltetrahydro-2H-pyran-4-yl acetate: 15 wt.-%
3-pentyltetrahydro-2H-pyran-4-yl acetate: 50 wt.-%
(Z)-hex-3-en-1-yl methyl carbonate: 5 wt.-%
3-(4-(tert-butyl)phenyl)-2-methylpropanal: 25 wt.-%
1-methyl-4-prop-1-en-2-yl-cyclohexene: 85 wt.-%
2-(5-methyl-5-vinyltetrahydrofuran-2-yl) propan-2-ol: 1 wt.-%
3,7-dimethylocta-1,6-dien-3-ol: 25 wt.-%
3,7-dimethylocta-1,6-dien-3-yl acetate: 25 wt.-%
(4E)-9-hydroxy-5,9-dimethyl-4-decenal: 10 wt.-%
3-hydroxy-2-methyl-4H-pyran-4-one: 1 wt.-%
ethyl 2-methylpentanoate: 10 wt.-%
(4-isopropylcyclohexyl) methanol: 5 wt.-%
3-methyl-5-phenylpentan-1-ol: 10 wt.-%
2,6-dimethylhept-5-enal: 2 wt.-%
2-isopropyl-5-methylcyclohexanol: 85 wt.-%
2-isopropyl-5-methylcyclohexanone: 2 wt.-%
methyl 2-aminobenzoate: 15 wt.-%
methyl benzoate: 1 wt.-%
methyl 3-phenylprop-2-enoate: 10 wt.-%
2-ethoxy-4-(methoxymethyl) phenol: 1 wt.-%
methyl 2-hexyl-3-oxocyclopentane-1-carboxylate: 5 wt.-%
6-methylhept-5-en-2-one: 5 wt.-%
8-methyl-1-oxaspiro[4.5]decan-2-one: 2 wt.-%
methyl non-2-ynoate: 1 wt.-%
methyl 2-hydroxybenzoate: 1 wt.-%
(Z)-3-methylcyclopentadec-5-enone: 0.5 wt.-%
4-(4-methylpent-3-en-1-yl)cyclohex-3-enecarbaldehyde: 2 wt.-%
7-methyl-3-methyleneocta-1,6-diene: 0.5 wt.-%
2-methylundecanoic acid: 0.5 wt.-%
2-(2-(4-methylcyclohex-3-en-1-yl) propyl)cyclopentanone: 50 wt.-%
(E)-methyl non-2-enoate: 2 wt.-%
(2Z)-3,7-dimethylocta-2,6-dien-1-ol: 10 wt.-%
(E)-3,7,11-trimethyldodeca-1,6,10-trien-3-ol: 5 wt.-%
2-ethoxynaphthalene: 10 wt.-%
(Z)-3,7-dimethylocta-2,6-dien-1-yl acetate: 0.5 wt.-%
(E)-13-methyloxacyclopentadec-10-en-2-one: 2 wt.-%
(2E,6Z)-nona-2,6-dienal: 0.5 wt.-%
(2Z,6E)-2,6-nonadien-1-ol: 0.1 wt.-%

5-pentyloxolan-2-one: 15 wt.-%
(Z)-non-6-enal: 0.5 wt.-%
(Z)-non-6-en-1-ol: 0.5 wt.-%
2-(6,6-dimethylbicyclo[3.1.1]hept-2-en-2-yl)ethyl acetate: 5 wt.-%
3-(4-(2-methylpropyl)-2-methylphenyl) propanal: 25 wt.-%
octan-2-one: 5 wt.-%
1-(2-naphtalenyl)-ethanone: 10 wt.-%
(2-methoxyethyl)benzene: 2 wt.-%
5-heptyldihydrofuran-2 (3H)-one: 25 wt.-%
3,7-dimethyloctan-1-ol: 10 wt.-%
2-cyclohexylhepta-1,6-dien-3-one: 2 wt.-%
2-(phenoxy)ethyl 2-methylpropanoate: 10 wt.-%
2-phenyl-ethanal: 0.5 wt.-%
2-phenylethyl acetate: 15 wt.-%
2-phenylethanol: 25 wt.-%
2-phenylethyl 2-methylpropanoate: 2 wt.-%
2-phenylethyl 2-phenylacetate: 5 wt.-%
3-phenylpropan-1-ol: 1 wt.-%
6,6-dimethyl-2-methylenebicyclo[3.1.1]heptane: 0.5 wt.-%
3-(6,6-dimethylbicyclo[3.1.1]hept-2-en-2-yl) propanal: 0.1 wt.-%
(2E,5E)-5,6,7-trimethylocta-2,5-dien-4-one: 2 wt.-%
1-methyl-4-(4-methylpent-3-en-1-yl)cyclohex-3-enecarbaldehyde: 2 wt.-%
3-methylbut-2-en-1-yl acetate: 10 wt.-%
4-(4-hydroxyphenyl) butan-2-one: 5 wt.-%
4-methyl-2-(2-methylprop-1-en-1-yl)tetrahydro-2H-pyran: 2 wt.-%
4-methyl-2-phenyl-3,6-dihydro-2H-pyran: 2 wt.-%
3-methyl-5-(2,2,3-trimethylcyclopent-3-en-1-yl) pentan-2-ol: 10 wt.-%
ethyl (Z)-2-acetyl-4-methyltridec-2-enoate: 0.5 wt.-%
4-(dodecylthio)-4-methylpentan-2-one: 0.5 wt.-%
cyclopentadecanone, hexadecanolide: 20 wt.-%
1-phenylethyl acetate: 5 wt.-%
(E)-6-ethyl-3-methyloct-6-en-1-ol: 2 wt.-%
(E)-2-((3,5-dimethylhex-3-en-2-yl)oxy)-2-methylpropyl cyclopropanecarboxylate: 5 wt.-%
1-methyl-4-propan-2-ylcyclohexa-1,4-diene: 5 wt.-%
2-(4-methyl-1-cyclohex-3-enyl) propan-2-ol: 1 wt.-%
2-(4-methylcyclohex-3-en-1-yl) propan-2-ol: 25 wt.-%
1-methyl-4-(propan-2-ylidene)cyclohex-1-ene: 15 wt.-%
2-(4-methyl-1-cyclohex-3-enyl) propan-2-yl acetate: 25 wt.-%
3,7-dimethyloctan-3-ol: 50 wt.-%
oxacyclohexadecan-2-one: 10 wt.-%
2-isopropyl-5-methylphenol: 10 wt.-%
1-(cyclopropylmethyl)-4-methoxybenzene: 10 wt.-%
(E)-tridec-2-enenitrile: 15 wt.-%
3-phenylbutanal: 5 wt.-%
3-(benzo[d][1,3]dioxol-5-yl)-2-methylpropanal: 5 wt.-%
undecan-2-one: 0.1 wt.-%
(3E,5Z)-undeca-1,3,5-triene: 0.1 wt.-%
(E)-4-methyldec-3-en-5-ol: 25 wt.-%
4-hydroxy-3-methoxybenzaldehyde: 5 wt.-%
(Z)-cyclohexadec-5-enone: 0.1 wt.-%
(2E,6Z)-nona-2,6-dienenitrile: 0.1 wt.-%
2-methoxynaphtalene 15 wt-%.

2. The encapsulated composition according to claim 1, wherein each of the biodegradable ingredient(s) is/are present at a concentration equal to or higher than the minimum concentration of 0.01 wt.-%.

3. The encapsulated composition according to claim 1, wherein the water-soluble matrix comprises at least one material selected from the group consisting of starch, maltodextrin, mannitol, chitosan, gum Arabic, alginate, cellulose, pectins, gelatin, polyvinyl alcohol and mixtures thereof.

4. The encapsulated composition according to claim 3, wherein the starch is a water-soluble modified starch.

5. The encapsulated composition according to claim 4, wherein the water-soluble matrix comprises a water-soluble modified starch selected from the group consisting of bleached starch, hydroxypropyl starch, hydroxypropyl distarch phosphate, hydroxypropyl distarch glycerol, acetylated distarch phosphate, starch acetate esterified with acetic anhydride, starch acetate esterified with vinyl acetate, acetylated distarch adipate, acetylated distarch glycerol, starch sodium octenyl succinate and mixtures thereof.

6. The encapsulated composition according to claim 5, wherein the water-soluble matrix additionally comprises a material selected from the group consisting of maltodextrin, mannitol and mixtures thereof.

7. The encapsulated composition according to claim 3, wherein the water-soluble matrix additionally comprises a hemicellulose.

8. The encapsulated composition according to claim 7, wherein the hemicellulose is a xyloglucan.

9. The encapsulated composition according to claim 1, wherein the perfume composition is at least partially encapsulated in core-shell microcapsules comprising a core and a shell surrounding the core.

10. The encapsulated composition according to claim 9, wherein the perfume composition is fully encapsulated in the core-shell microcapsules.

11. The encapsulated composition according to claim 1, wherein the proportion of the perfume composition is 10 to 50 wt.-% relative to the total weight of the encapsulated composition.

12. The encapsulated composition according to claim 1, wherein the proportion of the water-soluble matrix is 30 to 90 wt.-% relative to the total weight of the encapsulated composition.

13. The encapsulated composition according to claim 9, wherein the proportion of the perfume composition, which is encapsulated in the core-shell microcapsules, is 5 to 30 wt.-% relative to the total weight of the encapsulated composition.

14. The encapsulated composition according to claim 1, wherein the composition is in particulate form.

15. A powder formulation comprising an encapsulated composition according to claim 14.

16. The powder formulation according to claim 15, additionally comprising a solid carrier.

17. The powder formulation according to claim 16, wherein the solid carrier is selected from the group consisting of urea, sodium chloride, sodium sulphate, sodium acetate, zeolite, sodium carbonate, sodium bicarbonate, clay, talc, calcium carbonate, magnesium sulfate, gypsum, calcium sulfate, magnesium oxide, zinc oxide, titanium dioxide, calcium chloride, potassium chloride, magnesium chloride, zinc chloride, saccharides, polyethylene glycol, polyvinylpyrrolidone, citric acid or any water soluble solid acid, fatty alcohols, fatty acids and mixtures thereof.

18. The powder formulation according to claim 15, wherein the proportion of the encapsulated composition is 0.1 to 50 wt.-% relative to the total weight of the encapsulated composition; and the proportion of the solid carrier is 10 to 99.9 wt.-% relative to the total weight of the encapsulated composition.

19. A process of preparing an encapsulated composition according to claim 1, the process comprising the steps of:

a) Preparing an emulsion or a suspension of a perfume composition in a solution of a matrix material in water;

b) Subjecting the emulsion or the suspension to drying to obtain an encapsulated composition in which the perfume composition is entrapped in a water-soluble matrix;

wherein the perfume composition comprises at least one biodegradable ingredient which is present at a total concentration of at least 75 wt.-% relative to the total weight of the perfume composition.

20. An encapsulated composition prepared by the process according to claim 19.

21. A consumer product comprising an encapsulated composition according to claim 1.

22. A solid scent booster composition comprising an encapsulated composition according to claim 1, and a solid vehicle.

23. The solid scent booster composition according to claim 22, wherein the solid scent booster composition is in form of a plurality of pastilles.

24. The solid scent booster composition according to claim 23, additionally comprising a non-encapsulated perfume composition.

25. The solid scent booster composition according to claim 23, additionally comprising core-shell microcapsules comprising a core and a shell surrounding the core.

26. The solid scent booster composition according to claim 23, wherein the solid vehicle has a melting temperature of 40° C. to 160° C.

27. The solid scent booster composition according to claim 23, wherein the solid vehicle comprises a polyol or a polyether.

28. The solid scent booster composition according to claim 23, wherein the proportion of the encapsulated composition is 1 wt.-% to 40 wt.-% relative to the total weight of the solid scent booster composition.

29. A method of obtaining a consumer product, the method comprising the incorporation of the encapsulated composition of claim 1 in the consumer product.

30. A consumer product of claim 21 which is selected from a fabric care product, a home care product and a personal care product.

* * * * *